United States Patent
Matsumura et al.

(10) Patent No.: US 10,994,724 B2
(45) Date of Patent: May 4, 2021

(54) VEHICLE TRAVEL CONTROL APPARATUS

(71) Applicant: TOYOTA JIDOSHA KABUSHIKI KAISHA, Toyota (JP)

(72) Inventors: Takeshi Matsumura, Numazu (JP); Hirotada Otake, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 15/484,643

(22) Filed: Apr. 11, 2017

(65) Prior Publication Data

US 2017/0297566 A1 Oct. 19, 2017

(30) Foreign Application Priority Data

Apr. 13, 2016 (JP) .............................. JP2016-080454

(51) Int. Cl.
  *B60W 30/08* (2012.01)
  *B60K 28/06* (2006.01)
  (Continued)

(52) U.S. Cl.
  CPC ............. *B60W 30/08* (2013.01); *B60K 28/06* (2013.01); *B60W 30/143* (2013.01); *B60W 40/072* (2013.01); *B60W 40/08* (2013.01); *B60W 2040/0818* (2013.01); *B60W 2050/0071* (2013.01); *B60W 2420/42* (2013.01); *B60W 2420/52* (2013.01); *B60W 2540/18* (2013.01); *B60W 2540/22* (2013.01);
  (Continued)

(58) Field of Classification Search
  CPC . B60K 28/06; B60K 28/066; B60W 2540/26; B60W 10/18; B60W 30/12; B60T 7/12; B60T 7/18; B62D 15/025

USPC .......... 701/41, 93, 96; 340/435, 439; 348/77
See application file for complete search history.

(56) References Cited

U.S. PATENT DOCUMENTS

2001/0003436 A1* 6/2001 Yoshikawa .......... B60K 28/066
  340/439
2005/0270145 A1* 12/2005 Kataoka ............... B62D 15/025
  340/435

(Continued)

FOREIGN PATENT DOCUMENTS

CN 103380033 A 10/2013
CN 104487308 A 4/2015

(Continued)

*Primary Examiner* — Alexander G Kalinowski
*Assistant Examiner* — Sanjeev Malhotra
(74) *Attorney, Agent, or Firm* — Oblon, McClelland, Maier & Neustadt, L.L.P.

(57) ABSTRACT

A vehicle travel control apparatus includes an actuator and an electronic control unit. The electronic control unit is configured to determine whether a driver of a vehicle is in an abnormal state where the driver loses an ability of driving the vehicle. The electronic control unit is also configured to stop the vehicle at an abnormality determination time point onward, and control a vehicle speed by using the actuator such that the vehicle speed does not become lower than a lower limit vehicle speed in a period from the abnormality determination time point to a time point when the vehicle is stopped. The lower limit vehicle speed is set in accordance with a road shape influencing timing when a driver of another vehicle traveling behind the vehicle visually recognizes the vehicle.

13 Claims, 16 Drawing Sheets

(51) Int. Cl.
  *B60W 30/14* (2006.01)
  *B60W 40/072* (2012.01)
  *B60W 40/08* (2012.01)
  *B60W 50/00* (2006.01)

(52) U.S. Cl.
  CPC ..... *B60W 2540/26* (2013.01); *B60W 2552/15* (2020.02); *B60W 2552/30* (2020.02); *B60W 2720/10* (2013.01); *B60W 2720/106* (2013.01)

(56) References Cited

U.S. PATENT DOCUMENTS

| | | | | |
|---|---|---|---|---|
| 2006/0025918 | A1* | 2/2006 | Saeki | B60W 10/06 |
| | | | | 701/96 |
| 2013/0162794 | A1* | 6/2013 | Wakiyama | A61B 5/1103 |
| | | | | 348/77 |
| 2013/0311043 | A1* | 11/2013 | Kobana | B60T 7/12 |
| | | | | 701/41 |
| 2015/0203126 | A1* | 7/2015 | Kobana | B60K 28/06 |
| | | | | 701/93 |
| 2015/0307100 | A1* | 10/2015 | Shimizu | B60T 7/12 |
| | | | | 701/96 |

FOREIGN PATENT DOCUMENTS

| | | |
|---|---|---|
| DE | 102 20 782 A1 | 11/2003 |
| DE | 10 2008 039 882 A1 | 2/2008 |
| EP | 2 657 921 A1 | 10/2013 |
| EP | 2 878 507 A1 | 6/2015 |
| JP | 6-156112 A | 6/1994 |
| JP | 2006-315491 | 11/2006 |
| JP | 2008-195402 | 8/2008 |
| JP | 4172434 | 10/2008 |
| JP | 2009-73462 | 4/2009 |
| JP | 2009-190464 | 8/2009 |
| JP | 4349210 | 10/2009 |
| JP | 2010-6279 | 1/2010 |
| JP | 4465817 | 5/2010 |
| JP | 4929777 | 5/2012 |
| JP | 2013-152700 | 8/2013 |
| JP | 5569602 B2 | 7/2014 |
| JP | 2014-148293 | 8/2014 |

* cited by examiner

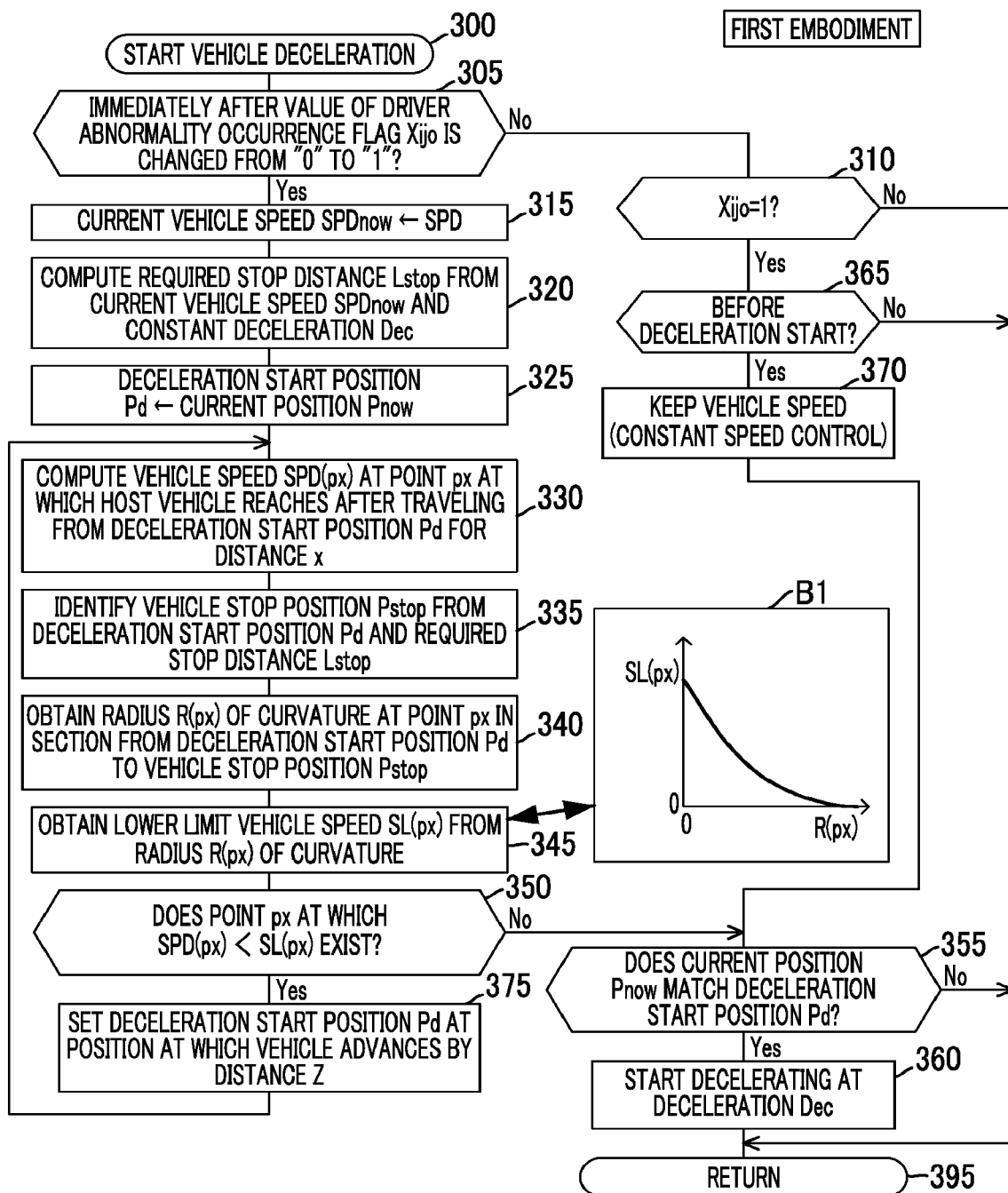

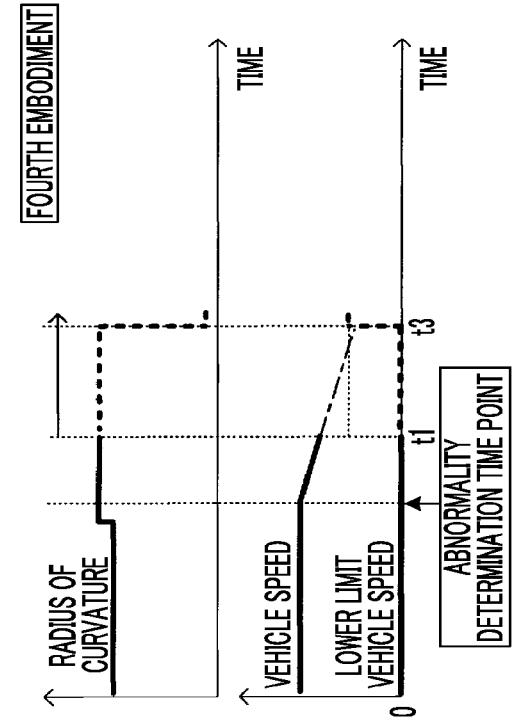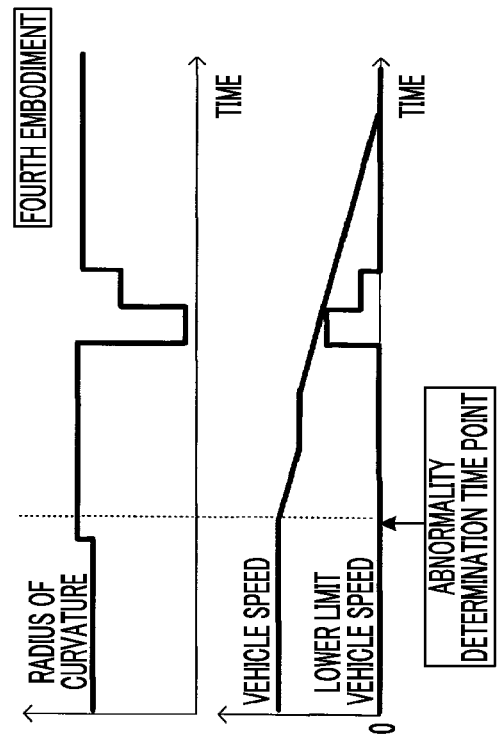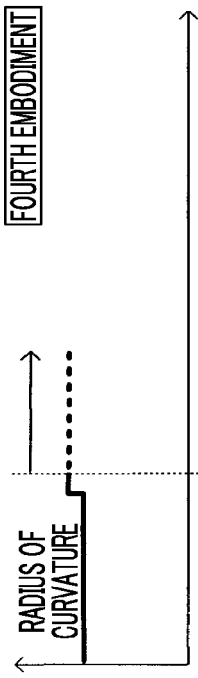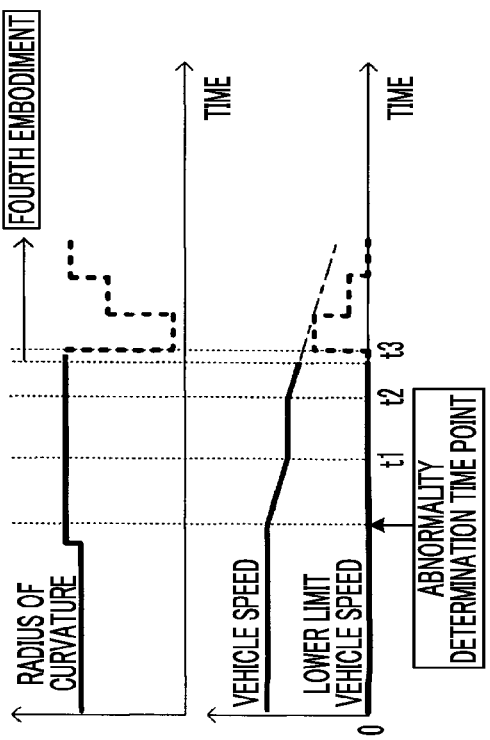

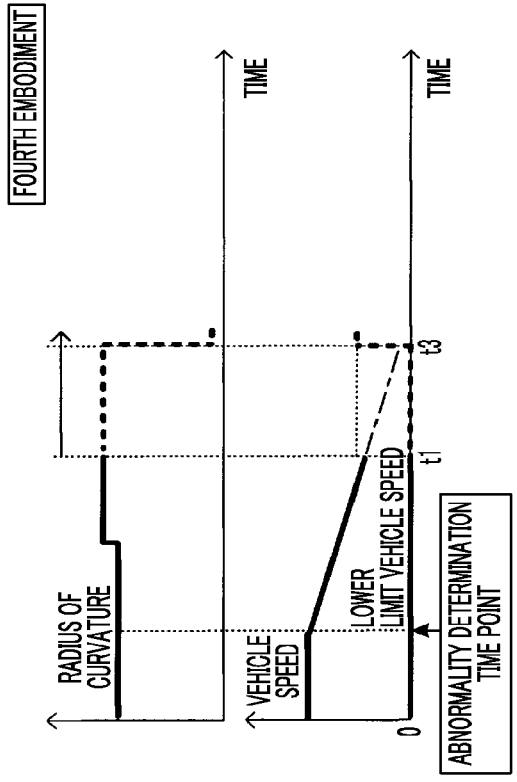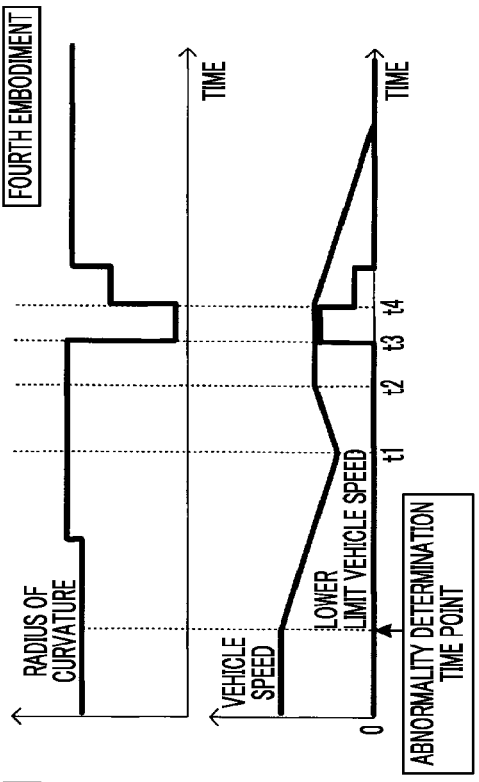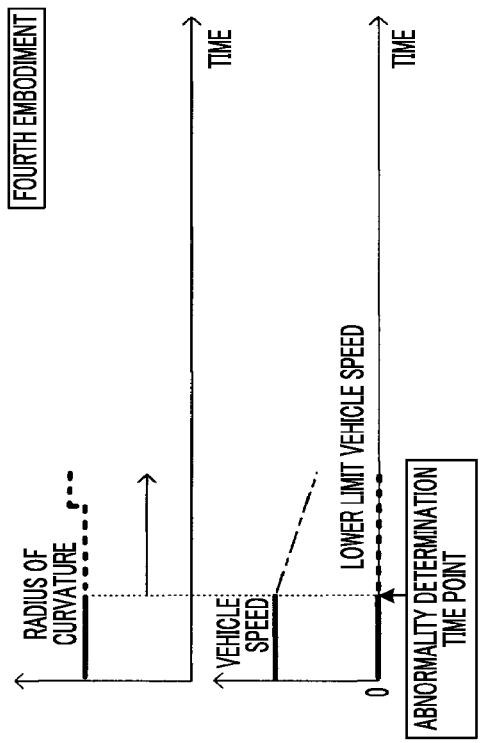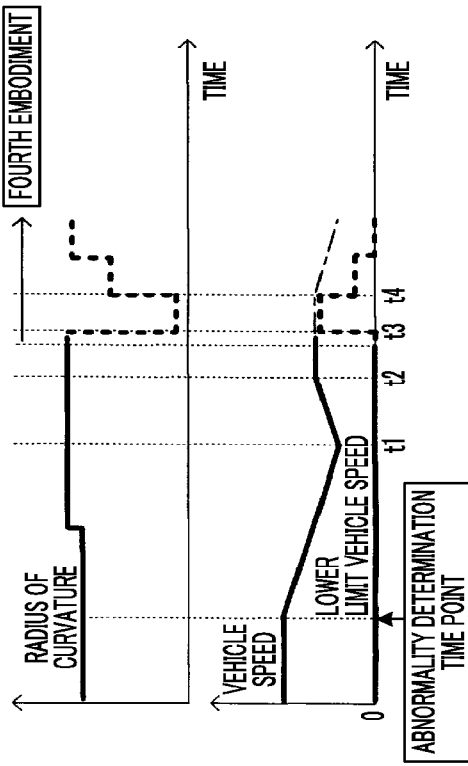

VEHICLE TRAVEL CONTROL APPARATUS

INCORPORATION BY REFERENCE

The disclosure of Japanese Patent Application No. 2016-080454 filed on Apr. 13, 2016 including the specification, drawings and abstract is incorporated herein by reference in its entirety.

BACKGROUND

1. Technical Field

The disclosure relates to a vehicle travel control apparatus.

2. Description of Related Art

A device that determines whether a driver falls in an abnormal state where the driver loses an ability of driving a vehicle (for example, a drowsy driving state, a mental and physical function stopped state, or the like) and decelerates the vehicle when such a determination is made has been proposed (for example, see Japanese Patent Application Publication No. 2009-73462 (JP 2009-73462 A)). Note that hereinafter the "abnormal state where the driver loses the ability of driving the vehicle" will also simply be referred to as a "driving incapable abnormal state" and the "determination on whether the driver is in the driving incapable abnormal state" will also simply be referred to as a "driver abnormality determination".

SUMMARY

According to the conventional device, in the case where it is determined that the driver falls in the driving incapable abnormal state, the vehicle continues to be decelerated, and a vehicle speed is reduced also in a region with poor visibility due to a road shape, like a point immediately after the vehicle passes a curved road and a pass, for example. As a result, a driver in a vehicle behind may have to abruptly brake to avoid a collision when recognizing the vehicle.

The disclosure provides a vehicle travel control apparatus that reduces a vehicle speed when it is determined that a driver falls in a driving incapable abnormal state and that does not reduce the vehicle speed excessively when a vehicle travels in a region with poor visibility due to a road shape.

An aspect of the disclosure provides a vehicle travel control apparatus. The vehicle travel control apparatus according to the aspect includes at least one actuator and at least one electronic control unit. The at least one electronic control unit is configured to determine whether a driver of a vehicle is in an abnormal state where the driver loses an ability of driving the vehicle. The at least one electronic control unit is configured to stop the vehicle at an abnormality determination time point onward, the abnormality determination time point being a time point at which it is determined that the driver is in the abnormal state, and control a vehicle speed of the vehicle by using the at least one actuator such that the vehicle speed does not become lower than a lower limit vehicle speed, in a period from the abnormality determination time point to a time point at which the vehicle is stopped. The lower limit vehicle speed is set in accordance with a road shape influencing timing at which a driver of another vehicle traveling behind the vehicle visually recognizes the vehicle, among shapes of the road on which the vehicle travels.

According to the above, the vehicle speed of the deceleration target vehicle can be controlled such that the vehicle speed of the deceleration target vehicle is not excessively reduced (does not become lower than the lower limit vehicle speed) in the case where the deceleration target vehicle travels on the road with the poor visibility (such a road that the timing at which the driver of the vehicle behind the deceleration target vehicle visually recognizes the deceleration target vehicle is delayed in comparison with the timing on a straight and flat road). As a result of this, a possibility that the driver of the vehicle behind who recognizes the deceleration target vehicle has to abruptly brake the vehicle behind can be reduced.

In the aspect of the disclosure, the at least one electronic control unit may be configured to obtain information on the road shape, and may be configured to set the lower limit vehicle speed based on the information on the road shape.

In the aspect of the disclosure, the at least one electronic control unit may be configured to obtain information on a radius of curvature of the road at a point ahead of a point at which the vehicle travels at a current time point as the information on the road shape, and may be configured to set the lower limit vehicle speed to a higher value as the radius of curvature indicated by the info, illation on the radius of curvature is reduced.

According to the above, the radius of curvature of the road at the point ahead of the deceleration target vehicle can be obtained before the vehicle reaches the point ahead. Thus, the vehicle speed of the deceleration target vehicle can be controlled in advance such that the vehicle speed of the deceleration target vehicle does not fall below the lower limit vehicle speed. Furthermore, there is a tendency that the timing at which the driver of the vehicle behind recognizes the deceleration target vehicle is delayed as the radius of curvature is reduced. Thus, the lower limit vehicle speed is set to the higher value as the radius of curvature is reduced. As a result of this, the possibility that the driver of the vehicle behind who recognizes the deceleration target vehicle has to abruptly brake the vehicle behind can further be reduced.

In the aspect of the disclosure, the at least one electronic control unit may be configured to obtain the radius of curvature or the curvature of at least one section of the road as information on the radius of curvature of the road from a map database, and may be configured to set the lower limit vehicle speed for each of the section based on the radius of curvature or the curvature of each of the section. The at least one electronic control unit may be configured to determine a particular point reaching time point. The particular point reaching time point may be determined such that the vehicle speed of the vehicle in a period from the particular point reaching time point to the time point at which the vehicle is stopped does not become lower than the lower limit vehicle speed, the particular point reaching time point being at which the vehicle reaches a particular point ahead of a position at the abnormality determination time point, the lower limit vehicle speed being set for each of the section, when the vehicle reaches the particular point reaching time point while keeping a vehicle speed at the abnormality determination time point, and the vehicle is decelerated at constant deceleration from the particular point reaching time point. The at least one electronic control unit may be configured to make the vehicle travel at the vehicle speed at the abnormality determination time point, from the abnormality determination time point to the particular point reaching time point, and may be configured to decelerate the vehicle at the constant deceleration by using the at least one actuator from the particular point reaching time point.

When the map database is used as described above, it is possible to estimate in advance the road (the section of the road) with what kind of radius of curvature the deceleration target vehicle travels (in other words, how the lower limit vehicle speed is changed) until the deceleration target vehicle stops. Accordingly, the position at which the deceleration starts (the particular point) can be determined before starting of the deceleration in the case where the deceleration target vehicle is decelerated at the constant deceleration.

Furthermore, according to this aspect, the deceleration target vehicle is decelerated while the constant deceleration is kept. Such deceleration of keeping the constant deceleration differs from deceleration during vehicle speed automatic control in normal ACC (will be described below) or the like. Accordingly, occupants including the driver of the deceleration target vehicle can receive a sense of discomfort. Thus, if the driver is not in the driving incapable abnormal state, the driver and passenger, if the passenger exists, can recognize that the vehicle is forcibly decelerated. In addition, because the deceleration does not fluctuate, a possibility that the driver of the other vehicle traveling around the deceleration target vehicle has to perform a special drive operation such as abrupt braking or abrupt steering can be reduced. Note that this effect is an effect exerted in a similar manner in another aspect of the disclosure in which the deceleration target vehicle is decelerated while keeping the constant deceleration.

In the aspect of the disclosure, the at least one electronic control unit may be configured to obtain the radius of curvature or the curvature of at least one section of the road as the information on the radius of curvature of the road from a map database, and may be configured to set the lower limit vehicle speed for each of the section based on the radius of curvature or the curvature of each of the section. The at least one electronic control unit may be configured to determine constant deceleration such that the vehicle speed of the vehicle in the period from the abnormality determination time point to the time point at which the vehicle is stopped does not become lower than the lower limit vehicle speed set for each of the section when the vehicle is decelerated at the constant deceleration by using the at least one actuator from the abnormality determination time point, and may be configured to decelerate the vehicle at the constant deceleration from the abnormality determination time point.

As described above, by using the map database, it is possible to estimate in advance how the lower limit vehicle speed is changed until the deceleration target vehicle is stopped. Accordingly, before a start of the deceleration, it can be determined at what constant deceleration the deceleration target vehicle should be decelerated from the abnormality determination time point in order to prevent the vehicle speed of the deceleration target vehicle from becoming lower than the lower limit vehicle speed, which is set per the section of the road, until the time point at which the vehicle stops.

In the aspect of the disclosure, the at least one electronic control unit may be configured to obtain the radius of curvature or the curvature of at least one section as the information on the radius of curvature of the road from a map database. The at least one electronic control unit may be configured to set the lower limit vehicle speed for each of the section based on the radius of curvature or the curvature of each of the section. The at least one electronic control unit may be configured to decelerate the vehicle at constant deceleration at the abnormality determination time point onward, and temporarily interrupt deceleration of the vehicle and keep the vehicle speed of the vehicle in a period in which it is predicted that the vehicle speed of the vehicle becomes lower than the lower limit vehicle speed set for each of the section, the period being in the period from the abnormality determination time point to the time point at which the vehicle is stopped.

According to the above, the vehicle speed of the deceleration target vehicle can be prevented from falling below the lower limit vehicle speed, and the deceleration of the deceleration target vehicle can be continued when the vehicle speed of the deceleration target vehicle is higher than the lower limit vehicle speed. Accordingly, the vehicle speed of the deceleration target vehicle can be reduced as much as possible while the vehicle speed of the deceleration target vehicle is prevented from falling below the lower limit vehicle speed.

In the aspect of the disclosure, the vehicle travel control apparatus according to the aspect may further include a camera device that obtains image data by capturing an image in front of the vehicle. The at least one electronic control unit may be configured to obtain the radius of curvature or the curvature of the road at a particular point ahead of a position of the vehicle at the current time point by a specified distance as the information on the radius of curvature of the road based on the image data, and may be configured to set the lower limit vehicle speed based on the radius of curvature or the curvature at the particular point. In the case where it is predicted that the vehicle speed at a time when the vehicle reaches the particular point becomes lower than the lower limit vehicle speed when the vehicle is decelerated at constant deceleration from the abnormality determination time point onward, the at least one electronic control unit may be configured to make the vehicle travel at a constant speed so as to keep the vehicle speed of the vehicle at a time point when the vehicle speed is predicted, in the case where the vehicle speed of the vehicle at the time point when the vehicle speed is predicted is equal to or higher than the lower limit vehicle speed at the particular point, and may be configured to accelerate the vehicle by using the at least one actuator such that the vehicle speed of the vehicle becomes equal to or higher than the lower limit vehicle speed at the particular point before the vehicle reaches the particular point in the case where the vehicle speed of the vehicle at the time point when the vehicle speed is predicted is lower than the lower limit vehicle speed at the particular point.

According to the above, for example, even when the information of the map database cannot be used, even when the information of the map database is old information, or the like, the vehicle speed of the deceleration target vehicle can be gradually reduced while the vehicle speed of the deceleration target vehicle is prevented from significantly falling below the lower limit vehicle speed.

In the aspect of the disclosure, the at least one electronic control unit may be configured to obtain information on a radius of curvature of the road at a point at which the vehicle travels at a current time point as the information on the road shape, and may be configured to set the lower limit vehicle speed to a higher value as the radius of curvature indicated by the information on the radius of curvature is reduced.

According to the above, the lower limit vehicle speed at the current time point is set to the higher value as the radius of curvature of the road at the point at which the deceleration target vehicle travels at the current time point is reduced. Accordingly, the vehicle speed of the deceleration target vehicle can be controlled such that the vehicle speed of the deceleration target vehicle at the current time point does not fall below the lower limit vehicle speed of the road on which the deceleration target vehicle travels at the current time point.

In the aspect of the disclosure, the vehicle travel control apparatus according to the aspect may further include a camera device that obtains image data by capturing an image in front of the vehicle. The at least one electronic control unit may be configured to obtain the radius of curvature or the curvature of the road at the point at which the vehicle travels at the current time point as the information on the radius of curvature of the road based on the image data. The at least one electronic control unit may be configured to decelerate the vehicle when the vehicle speed of the vehicle at the current time point is higher than the lower limit vehicle speed at the point at which the vehicle travels at the current time point, and the at least one electronic control unit may be configured to accelerate the vehicle by using the at least one actuator such that the vehicle speed of the vehicle becomes equal to or higher than the lower limit vehicle speed, when the vehicle speed of the vehicle at the current time point is lower than the lower limit vehicle speed at the point at which the vehicle travels at the current time point.

According to the above, the vehicle speed of the deceleration target vehicle at the current time point can be controlled on the basis of the image data obtained by the camera device such that the vehicle speed of the deceleration target vehicle does not fall below the lower limit vehicle speed of the road on which the deceleration target vehicle travels at the current time point.

In the aspect of the disclosure, the at least one electronic control unit may be configured to obtain information on a grade change amount of the road as the information on the road shape, and set the lower limit vehicle speed to a higher value as the grade change amount at a point of a pass, the point of the pass being indicated by the information on the grade change amount, is increased.

In the case where the deceleration target vehicle travels by passing the pass in which a grade of the road is changed from an up grade to a down grade, timing at which the driver of the vehicle behind recognizes the deceleration target vehicle is delayed longer as the grade change amount (dI) before and after the pass is increased. Accordingly, when the lower limit vehicle speed is set on the basis of the grade change amount as in the above aspect, the possibility that the driver of the vehicle behind who recognizes the deceleration target vehicle traveling by passing the pass has to abruptly brake the vehicle behind can be reduced.

In the aspect of the disclosure, the at least one electronic control unit may be configured to obtain the information on the grade change amount from a map database, and may be configured to set the lower limit vehicle speed to a higher value as the grade change amount is increased.

In the aspect of the disclosure, the at least one electronic control unit may be configured to obtain a travel distance for which the vehicle travels after passing the point of the pass, and may be configured to set the lower limit vehicle speed to a higher value as the travel distance is reduced.

According to the above, speed control of the deceleration target vehicle can be executed such that the vehicle speed of the deceleration target vehicle of a case where the deceleration target vehicle travels in a region near the point of the pass becomes higher than the vehicle speed of the deceleration target vehicle of a case where the deceleration target vehicle travels in a region far from the point of the pass. Thus, the possibility that the driver of the vehicle behind who recognizes the deceleration target vehicle has to abruptly brake the vehicle behind can further be reduced.

In the aspect of the disclosure, the at least one electronic control unit may be configured to determine that the driver of the vehicle is in the abnormal state when the driver of the vehicle does not perform a predetermined operation for a longer time than a predetermined time.

In the aspect of the disclosure, the at least one electronic control unit may be configured to determine that the driver of the vehicle is in the abnormal state when the driver of the vehicle does not perform a drive operation for the longer time than the predetermined time.

In the aspect of the disclosure, the vehicle travel control apparatus according to the aspect may further include a confirmation button mounted on the vehicle. The at least one electronic control unit may be configured to make notification of urging the driver of the vehicle to operate the confirmation button and may be configured to determine that the driver of the vehicle is in the abnormal state when the driver of the vehicle does not operate the confirmation button for a predetermined time after the notification is made.

In the above description, in order to facilitate understanding of the disclosure, components of the disclosure that correspond to those of embodiments, which will be described below, are each added with a name and/or a reference numeral used in the embodiment in a parenthesis. However, each of the components of the disclosure is not limited to that of the embodiments defined by the name and/or the reference numeral. Other purposes, other features, and accompanying advantages of the disclosure will easily be understood from the description of the embodiments of the disclosure with reference to drawings below.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a flowchart of a routine that is executed by a CPU of the first apparatus;

FIG. 10A is a time chart for explaining actuation of a vehicle travel control apparatus (a fourth apparatus) according to a fourth embodiment of the disclosure;

FIG. 10B is a time chart for explaining the actuation of the vehicle travel control apparatus (the fourth apparatus) according to the fourth embodiment of the disclosure;

FIG. 10C is a time chart for explaining the actuation of the vehicle travel control apparatus (the fourth apparatus) according to the fourth embodiment of the disclosure;

FIG. 10D is a time chart for explaining the actuation of the vehicle travel control apparatus (the fourth apparatus) according to the fourth embodiment of the disclosure;

FIG. 11A is a time chart for explaining the actuation of the vehicle travel control apparatus (the fourth apparatus) according to the fourth embodiment of the disclosure;

FIG. 11B is a time chart for explaining the actuation of the vehicle travel control apparatus (the fourth apparatus) according to the fourth embodiment of the disclosure;

FIG. 11C is a time chart for explaining the actuation of the vehicle travel control apparatus (the fourth apparatus) according to the fourth embodiment of the disclosure;

FIG. 11D is a time chart for explaining the actuation of the vehicle travel control apparatus (the fourth apparatus) according to the fourth embodiment of the disclosure;

DETAILED DESCRIPTION OF EMBODIMENTS

A description will hereinafter be made on a vehicle travel control apparatus (a drive assist system) according to each embodiment of the disclosure with reference to the drawings.

First Embodiment

Figure 1:
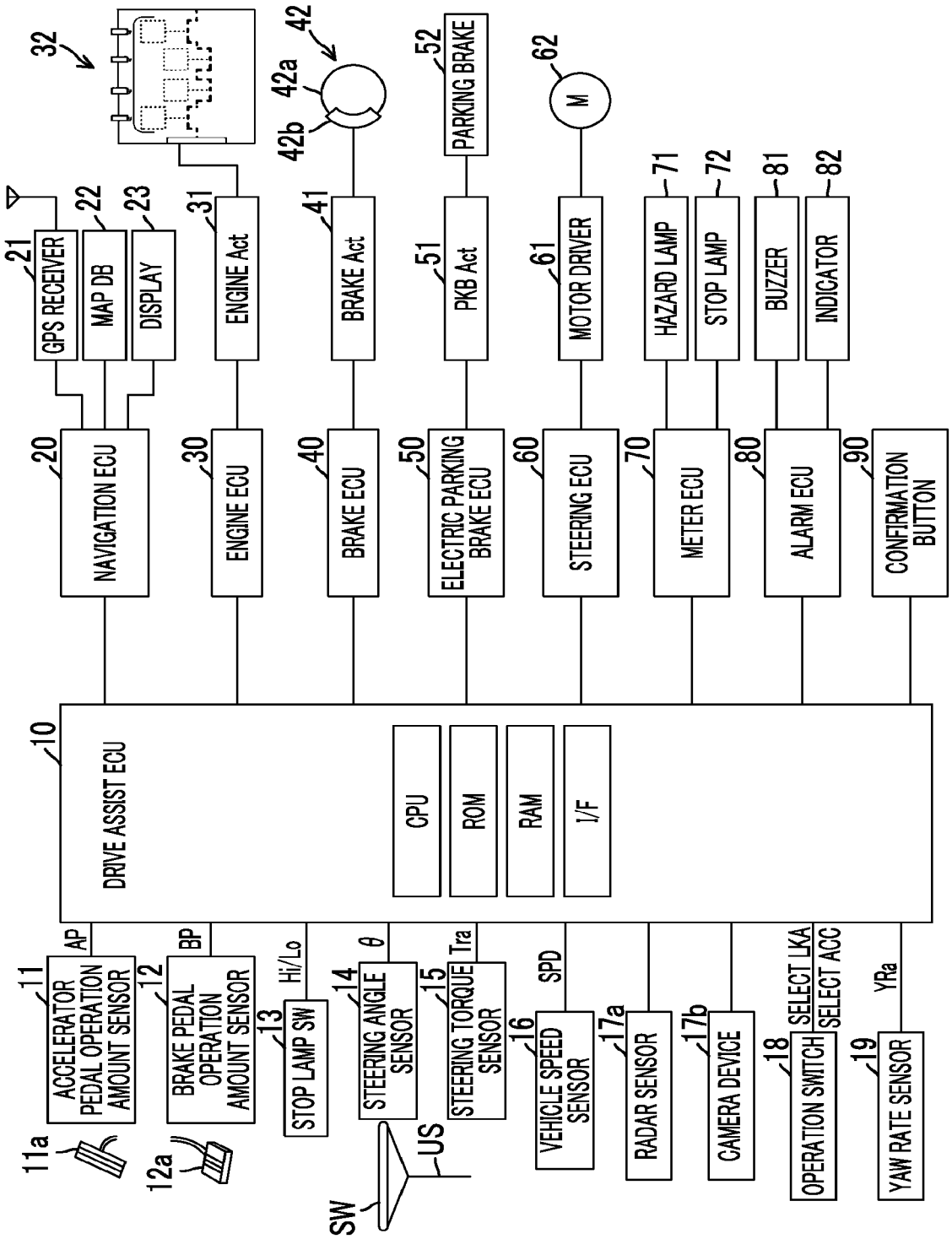
FIG. 1 is a schematic configuration diagram of a vehicle travel control apparatus (a first apparatus) according to a first embodiment of the disclosure.

As shown in FIG. 1, a vehicle travel control apparatus according to a first embodiment of the disclosure (hereinafter may also be referred to as a "first apparatus") is applied to a vehicle (hereinafter may also be referred to as a "host vehicle" to be distinguished from other vehicles) and includes a drive assist ECU 10, a navigation ECU 20, an engine ECU 30, a brake ECU 40, an electric parking brake ECU 50, a steering ECU 60, a meter ECU 70, and an Mann ECU 80.

These ECUs are each an electric control unit that includes a microcomputer as a main component, are mutually connected to be able to transmit and receive information via a controller area network (CAN), which is not shown. In this specification, the microcomputer includes a CPU, ROM, RAM, non-volatile memory, an interface I/F, and the like. The CPU executes instructions (programs, routines) stored in the ROM to realize various functions. Some or all of these ECUs may be integrated into one ECU.

The drive assist ECU 10 is connected to sensors (including switches), which will be listed below, and receives detection signals or output signals of those sensors. Note that each of the sensors may be connected to any of the ECUs other than the drive assist ECU 10. In such a case, the drive assist ECU 10 receives the detection signal or the output signal of the sensor from the ECU, to which the sensor is connected, via the CAN.

An accelerator pedal operation amount sensor 11 detects an operation amount (an accelerator opening degree) of an accelerator pedal 11a of the host vehicle and outputs a signal indicative of an accelerator pedal operation amount AP. A brake pedal operation amount sensor 12 detects an operation amount of a brake pedal 12a of the host vehicle and outputs a signal indicative of a brake pedal operation amount BP. A stop lamp switch 13 outputs a low-level signal when the brake pedal 12a is not depressed (not operated), and outputs a high-level signal when the brake pedal 12a is depressed (operated).

A steering angle sensor 14 detects a steering angle of the host vehicle and outputs a signal indicative of a steering angle θ. A steering torque sensor 15 detects steering torque that is applied to a steering shaft US of the host vehicle through an operation of a steering wheel SW, and outputs a signal indicative of steering torque Tra. A vehicle speed sensor 16 detects a traveling speed of the host vehicle (a vehicle speed) and outputs a signal indicative of a vehicle speed SPD.

A radar sensor 17a obtains information on a front road of the host vehicle and stereoscopic objects on the road. The stereoscopic objects include, for example, moving objects such as a pedestrian, a bicycle, and an automobile, and fixed objects such as a utility pole, a tree, and a guardrail. Hereinafter, these stereoscopic objects may each be referred to as a "target object".

The radar sensor 17a includes "a radar transmission/reception section and a signal processing section", neither of which is shown. The radar transmission/reception section emits a radio wave of a millimeter-wave band (hereinafter referred to as a "millimeter wave") to a peripheral region of the host vehicle that includes a front region of the host vehicle, and receives the millimeter wave that is reflected by the target object existing in a radiation range (that is, a reflected wave). Based on a phase difference between the transmitted millimeter wave and the received reflected wave, an attenuation level of the reflected wave, a time from transmission of the millimeter wave to reception of the reflected wave, and the like, the signal processing section obtains an inter-vehicular distance (a longitudinal distance) Dfx(n), a relative speed Vfx(n), a horizontal distance Dfy(n), a relative horizontal speed Vfy(n), and the like with respect to each detected target object (n) every time a specified time elapses.

The inter-vehicular distance Dfx(n) is a distance between the host vehicle and the target object (n) (for example, a preceding vehicle) along a center axis of the host vehicle. The relative speed Vfx(n) is a difference (=Vs−Vj) between a speed Vs of the target object (n) (for example, the preceding vehicle) and a speed Vj of a host vehicle VA. The speed Vs of the target object (n) is a speed of the target object (n) in a traveling direction of the host vehicle. The horizontal distance Dfy(n) is a distance of a "center position of the target object (n) (for example, a center position in vehicle width of the preceding vehicle)" from the center axis of the host vehicle in a direction that is orthogonal to the center axis. The horizontal distance Dfy(n) will also be referred to as a "horizontal position". The relative horizontal speed Vfy(n) is a speed at the center position of the target object (n) (for example, the center position in vehicle width of the preceding vehicle) in the direction that is orthogonal to the center axis of the host vehicle.

A camera device 17b includes "a stereo camera and an image processing section", neither of which is shown. The stereo camera obtains a right and left pair of image data by capturing scenery of a left region and a right region in front of the vehicle. Based on the right and left pair of the image data captured by the stereo camera, the image processing section calculates and outputs presence or absence of the target object, a relative relationship between the host vehicle and the target object, and the like.

Note that the drive assist ECU 10 determines the relative relationship between the host vehicle and the target object (target object information) by synthesizing the relative relationship between the host vehicle and the target object obtained by the radar sensor 17a and the relative relationship between the host vehicle and the target object obtained by the camera device 17b. Furthermore, based on the right and left pair of the image data (road image data) captured by the camera device 17b, the drive assist ECU 10 recognizes lane markers (hereinafter simply referred to as "lane lines"), such as right and left lane lines, on the road and obtains a road shape (a radius of curvature indicative of a degree of curvature of the road), a positional relationship between the road and the vehicle, and the like. Moreover, based on the road image data captured by the camera device 17b, the drive assist ECU 10 can obtain information on whether a roadside wall exists.

An operation switch 18 is a switch operated by a driver. The driver can select whether to execute lane keeping assist control (LKA) by operating the operation switch 18. Furthermore, the driver can select whether to execute adaptive cruise control (ACC) by operating the operation switch 18.

A yaw rate sensor 19 detects a yaw rate of the host vehicle and outputs an actual yaw rate YRa.

The drive assist ECU 10 can execute the LKA and the ACC. Furthermore, as will be described below, the drive assist ECU 10 determines whether the driver is in an abnormal state where the driver loses the ability of driving the vehicle (a driving incapable abnormal state), and executes various types of control including the lane keeping assist control when determining that the driver is in the driving incapable abnormal state.

The navigation ECU 20 is connected to a GPS receiver 21 that receives a GPS signal for detecting a position of the host vehicle, a map database 22 that stores map information and the like, a touch panel display 23 as a human-machine interface, and the like. The navigation ECU 20 identifies a position Pnow at a current time point (a current position) of the host vehicle on the basis of the GPS signal, performs various types of arithmetic processing on the basis of the position Pnow of the host vehicle, the map information stored in the map database 22, and the like, and guides the driver through a route by using the display 23.

The map information stored in the map database 22 includes road information. The road information includes a parameter that indicates the road shape per section of the road (for example, the radius of curvature of the road indicative of the degree of curvature of the road or curvature). Note that the curvature is inverse of the radius of curvature.

The engine ECU 30 is connected to an engine actuator 31. The engine actuator 31 is an actuator that changes an operation state of an internal combustion engine 32. In this example, the internal combustion engine 32 is a multi cylinder engine of a gasoline fuel injection, spark ignition type and includes a throttle valve for adjusting an intake air amount. The engine actuator 31 at least includes a throttle valve actuator that changes an opening degree of the throttle valve. The engine ECU 30 can change torque that is generated by the internal combustion engine 32 by driving the engine actuator 31. The torque generated by the internal combustion engine 32 is transmitted to unillustrated drive wheels via an unillustrated transmission. Accordingly, the engine ECU 30 can control drive power of the host vehicle to change an accelerated state (acceleration) by controlling the engine actuator 31.

The brake ECU 40 is connected to a brake actuator 41. The brake actuator 41 is provided in a hydraulic circuit between a master cylinder, which is not shown, and a friction brake mechanism 42, the master cylinder pressurizes hydraulic oil by a depression force of a brake pedal, and the friction brake mechanism 42 is provided on each of right and left front and rear wheels. The friction brake mechanism 42 includes a brake disc 42a fixed to the wheel and a brake caliper 42b fixed to a vehicle body. The brake actuator 41 adjusts hydraulic pressure that is supplied to a wheel cylinder housed in the brake caliper 42b in accordance with an instruction from the brake ECU 40 and actuates the wheel cylinder by the hydraulic pressure. In this way, a brake pad is pressed against the brake disc 42a to generate a friction braking force. Thus, the brake ECU 40 can control a braking force of the host vehicle by controlling the brake actuator 41.

The electric parking brake ECU (hereinafter may be referred to as an "EPB ECU") 50 is connected to a parking brake actuator (hereinafter may be referred to as a "PKB actuator") 51. The PKB actuator 51 is an actuator that presses the brake pad against the brake disc 42a or that presses a shoe against a drum when a drum brake is provided, and the drum rotates with the wheel. Thus, the EPB ECU 50 applies a parking braking force to each of the wheels by using the PKB actuator 51 and thus can keep the vehicle in a stopped state.

The steering ECU 60 is a control unit of a well-known electric power steering system and is connected to a motor driver 61. The motor driver 61 is connected to a steering motor 62. The steering motor 62 is embedded in an unillustrated "steering mechanism that includes the steering wheel, the steering shaft coupled to the steering wheel, a steering gear mechanism, and the like" of the vehicle. The steering motor 62 generates torque by electric power supplied from the motor driver 61, can add steering assist torque by this torque, and can turn right and left turning wheels.

The meter ECU 70 is connected to an unillustrated digital display type meter and is also connected to a hazard lamp 71 and a stop lamp 72. The meter ECU 70 can flash the hazard lamp 71 and light the stop lamp 72 in accordance with an instruction from the drive assist ECU 10.

The alarm ECU 80 is connected to a buzzer 81 and an indicator 82. In accordance with an instruction from the drive assist ECU 10, the alarm ECU 80 can sound the buzzer 81 to alert the driver, light an alert mark (for example, a warning lamp), display a warning message, and display an actuation condition of drive assist control on the indicator 82.

Furthermore, the drive assist ECU 10 is connected to a confirmation button 90. The confirmation button 90 is disposed at a position where the driver can operate the confirmation button 90, outputs a low-level signal when not being operated, and outputs a high-level signal when being pressed for an operation.

(Overview of Actuation) Next, a description will be made on primary actuation of the drive assist ECU 10 (hereinafter also simply referred to as the "ECU 10") according to the first apparatus. The ECU 10 determines whether the driver is in "the abnormal state where the driver loses the ability of driving the vehicle (the driving incapable abnormal state)" by using one of various methods, which will be described below. For example, in the case where the vehicle speed SPD of the host vehicle is equal to or higher than a specified vehicle speed SPDth, the ECU 10 determines (monitors) whether a non-operating state where none of "the accelerator pedal operation amount AP, the brake pedal operation amount BP, and the steering torque Tra" is changed (a state where a drive operation is not performed) continues for an abnormality determination threshold time or longer. When the non-operating state continues for the abnormality determination threshold time or longer, it is determined that the driver is in the driving incapable abnormal state (such a determination that the driver falls in the driving incapable abnormal state is confirmed).

The ECU 10 executes the lane keeping assist control (LKA) when determining that the driver is in the driving incapable abnormal state. The lane keeping assist control is control for applying the steering torque to the steering mechanism so as to assist a steering operation by the driver such that the position of the host vehicle is kept near a target travel line within "a lane (a traveling lane) in which the host vehicle travels". The lane keeping assist control itself has been well known (for example, see Japanese Patent Application Publication No. 2008-195402 (JP 2008-195402 A), Japanese Patent Application Publication No. 2009-190464 (JP 2009-190464 A), Japanese Patent Application Publication No. 2010-6279 (JP 2010-6279 A), the specification of Japanese Patent No. 4349210, and the like). Thus, the lane keeping assist control will briefly be described below.

More specifically, based on the image data transmitted from the camera device 17b, the ECU 10 recognizes (obtains) "a left lane line LL and a right lane line LR" of the lane, on which the host vehicle travels, and determines a central position between those paired lane lines as a target travel line Ld. Furthermore, the ECU 10 calculates: a curve radius (a radius of curvature) R of the target travel line Ld; and the position and a direction of the host vehicle on the traveling lane, which is defined by the left lane line LL and the right lane line LR.

Then, the ECU 10 calculates: a distance Dc (hereinafter referred to as a "center distance Dc") in a road width direction between a front end central position of the host vehicle and the target travel line Ld; and a deviation angle θy (hereinafter referred to as a "yaw angle θy") between a direction of the target travel line Ld and the traveling direction of the host vehicle.

Furthermore, based on the center distance Dc, the yaw angle θy, and road curvature ν (=1/the radius R of curvature), the ECU 10 calculates a target yaw rate YRc* by the following equation (1) in a specified calculation cycle. In the equation (1), K1, K2, and K3 are control gains. The target yaw rate YRc* is a yaw rate that is set to allow the host vehicle to travel along the target travel line Ld.

$$YRc^* = K1 \times Dc + K2 \times \theta y + K3 \times \nu \quad (1)$$

Based on this target yaw rate YRc* and the actual yaw rate YRa, the ECU 10 calculates target steering torque Tr* for obtaining the target yaw rate YRc* in the specified calculation cycle. More specifically, the ECU 10 stores a lookup table in advance, the lookup table defining a relationship between the target steering torque Tr* and a deviation between the target yaw rate YRc* and the actual yaw rate YRa. Then, the ECU 10 calculates the target steering torque Tr* by applying the deviation between the target yaw rate YRc* and the actual yaw rate YRa to this table. Thereafter, the drive assist ECU 10 controls the steering motor 62 by using the steering ECU 60 such that the actual steering torque Tra matches the target steering torque Tr*. What has been described above is the overview of the lane keeping assist control.

Figure 2A:
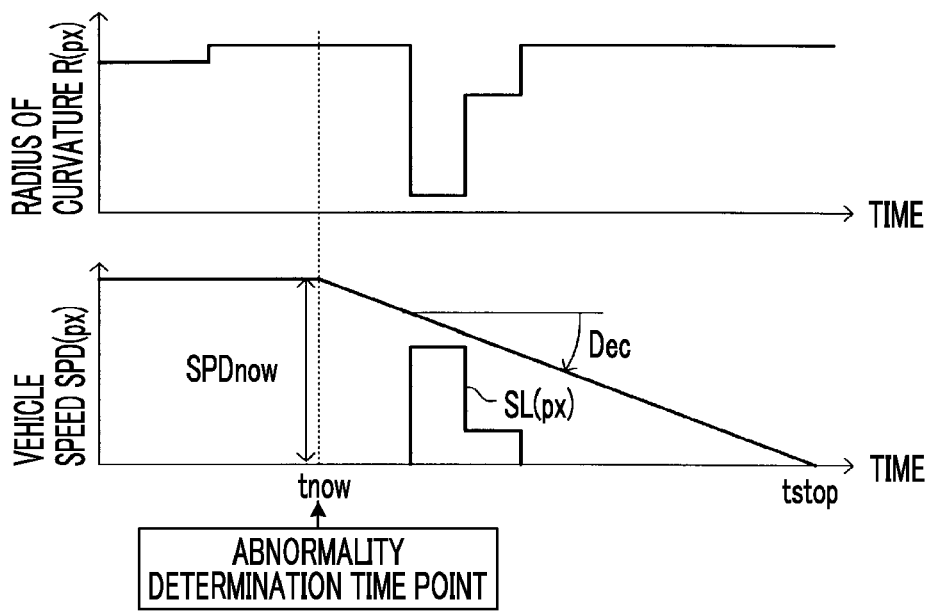
FIG. 2A is a time chart for explaining actuation of the first apparatus.
Figure 2B:
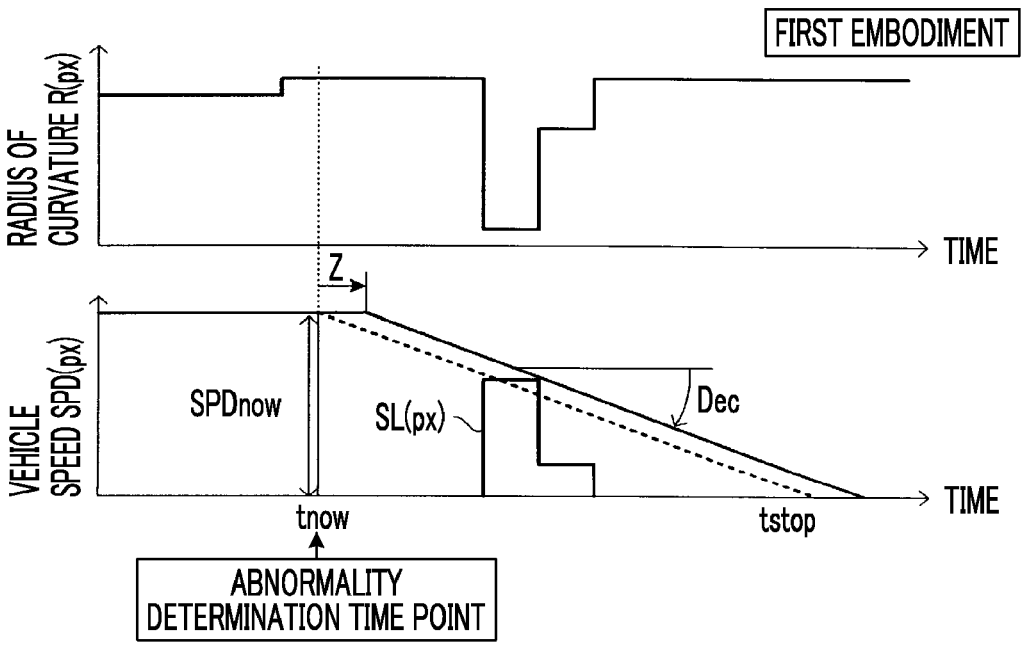
FIG. 2B is a time chart for explaining the actuation of the first apparatus.

In addition, when determining that the driver is in the driving incapable abnormal state, as shown in FIG. 2A and FIG. 2B, the ECU 10 computes a required stop distance (=SPDnow$^2$/(2·|Dec|)) that is a distance until a stop of the host vehicle (the vehicle speed SPD=0) by decelerating the host vehicle from a current vehicle speed SPDnow of the host vehicle at constant deceleration Dec. In the case where the host vehicle is decelerated from the current vehicle speed SPDnow at the constant deceleration Dec, the ECU 10 computes a vehicle speed SPD(px) of the host vehicle at a point px at which the host vehicle reaches after traveling for a distance x from a current position Pnow.

The ECU 10 identifies a position Pstop at which the host vehicle stops from the current position Pnow and the required stop distance of the host vehicle. The ECU 10 obtains information on the road shape between the current position Pnow and the stop position Pstop from the map database 22 via the navigation ECU 20. The information on this road shape includes the radius R of curvature of the road per section of the road (road section) between the current position Pnow and the stop position Pstop. In other words, the ECU 10 obtains a radius R(px) of curvature of the road at the point px.

Based on the radius R(px) of curvature of the road, the ECU 10 computes a lower limit vehicle speed SL(px) at the point px at which the host vehicle reaches after traveling for the distance x from the current position Pnow. As the radius R(px) of curvature is reduced, the curved road becomes sharper (a sharper curve). Thus, as the radius R(px) of curvature is reduced, visibility worsens (that is, a distance for which a driver of a vehicle behind can visually recognize the preceding vehicle is short, in other words, timing at which the driver of the vehicle behind recognizes the preceding vehicle tends to be delayed). Based on such a viewpoint, the lower limit vehicle speed SL(px) is set to be increased as the radius R(px) of curvature is reduced. The lower limit vehicle speed SL(px) is set to such a speed that, when the host vehicle travels at a lower speed than the lower limit vehicle speed SL(px), the driver of the vehicle behind has to abruptly brake the vehicle behind immediately after recognizing the host vehicle.

The ECU 10 determines whether the vehicle speed SPD (px) becomes lower than the lower limit vehicle speed SL(px) between the current position Pnow and the stop position Pstop. For example, in an example shown in FIG. 2A, the point px at which the vehicle speed SPD(px) becomes lower than the lower limit vehicle speed SL(px) does not exist until the stop of the host vehicle. Accordingly, in this case, the ECU 10 immediately starts decelerating the host vehicle at the deceleration Dec from a time point at which it is determined that the driver is in the driving incapable abnormal state (that is, an abnormality determination time point) tnow. Note that the ECU 10 computes the acceleration of the host vehicle from a change amount of the vehicle speed SPD per unit time that is obtained on the basis of a signal from the vehicle speed sensor 16, and transmits a command signal used to make the acceleration correspond to the deceleration Dec (or target acceleration) to the engine ECU 30 and the brake ECU 40. This point is the same in the other embodiments.

On the other hand, in an example indicated by a broken line in FIG. 2B, the point px at which the vehicle speed SPD(px) becomes lower than the lower limit vehicle speed SL(px) until the stop of the host vehicle exists. Accordingly, as indicated by a solid line in FIG. 2B, the ECU 10 delays a time point at which the host vehicle starts being decelerated from the abnormality determination time point tnow, and decelerates the host vehicle at the constant deceleration Dec such that the vehicle speed SPD(px) does not become lower than the lower limit vehicle speed SL(px) in a period from a start of the deceleration of the host vehicle to the stop of the host vehicle. According to this, a situation where the host vehicle whose driver is in the driving incapable abnormal state (that is, a deceleration target vehicle) travels at an excessively low speed on a sharp curved road with the poor visibility does not occur. Thus, when recognizing the host vehicle, the driver of the vehicle behind can decelerate or stop without abruptly braking the vehicle behind.

Furthermore, the first apparatus decelerates the deceleration target vehicle (the host vehicle) while keeping the constant deceleration. Such deceleration with the constant deceleration being kept differs from deceleration during vehicle speed automatic control in the normal ACC (will be described below) or the like. Accordingly, occupants including the driver of the deceleration target vehicle can receive a sense of discomfort. Thus, if the driver is not in the driving incapable abnormal state, the driver and passenger, if the passenger exists, can recognize that the vehicle is forcibly decelerated. In addition, because the deceleration does not fluctuate, a possibility that the driver of the other vehicle (including the vehicle behind) traveling around the deceleration target vehicle has to perform a special drive operation such as abrupt braking or abrupt steering can be reduced. Note that this effect is an effect exerted in a similar manner in another aspect (will be described below) in which the deceleration target vehicle is decelerated while keeping the constant deceleration. What has been described so far is the overview of the actuation of the first apparatus.

(Specific Actuation) Next, a description will be made on specific actuation of the CPU in the ECU 10 according to the first apparatus. The CPU executes routines shown in flowcharts of FIG. 3 to FIG. 5 every time the specified time elapses.

Vehicle Deceleration Start Processing At specified timing, the CPU starts processing in step 300 in FIG. 3, and the processing proceeds to step 305. Then, it is determined whether a current time point is immediately after a value of a flag (a driver abnormality occurrence flag) Xijo is changed from "0" to "1", the flag Xijo indicating that the determination of the driver being in the driving incapable abnormal state is confirmed. The value of this flag Xijo is set to "0" in an initial routine, which is not shown and is executed by the CPU, when an ignition key switch, which is not shown, is changed from an OFF position to an ON position. Then, as will be described below, when the determination that the driver s in the driving incapable abnormal state is confirmed, the value of this flag Xijo is set to "1".

Accordingly, if the driver does not fall in the driving incapable abnormal state after the start of driving of the host vehicle of this time, the value of the flag Xijo remains "0". In this case, the CPU determines "No" in step 305, and also determines "No" in step 310 in which it is determined whether the value of the flag Xijo is "1" Then, the processing directly proceeds to step 395, and this routine is terminated once. Thus, the host vehicle is not forcibly decelerated in this case.

On the other hand, if it is determined that the driver falls in the driving incapable abnormal state at the time after the start of driving of the host vehicle of this time, the value of the flag Xijo is changed from "0" to "1". Immediately after this change, the CPU determines "Yes" in step 305 and sequentially executes the processing from step 315 to step 345, which will be described below. Then, the processing proceeds to step 350.

Step 315: The CPU stores the vehicle speed SPD that is obtained on the basis of the signal from the vehicle speed sensor 16 as the current vehicle speed SPDnow. Step 320: Under assumption that the vehicle is decelerated from the current vehicle speed SPDnow while keeping the constant deceleration Dec, the CPU computes the required stop distance Lstop, which is described above, on the basis of the current vehicle speed SPDnow and the constant deceleration Dec. Step 325: The CPU obtains the current position Pnow from the navigation ECU 20 and stores the current position Pnow as a deceleration start position Pd. Step 330: Under the assumption that the vehicle is decelerated from the current vehicle speed SPDnow while keeping the constant deceleration Dec, the CPU computes the vehicle speed SPD(px) at the point px that is a point in a section from the deceleration start position Pd to a point separated therefrom by the required stop distance Lstop and is also a point at which the host vehicle reaches after traveling for the distance x from the deceleration start position Pd.

Step 335: The CPU identifies a position at which the host vehicle is expected to be stopped (hereinafter referred to as a "vehicle stop position") Pstop from the deceleration start position Pd and the required stop distance Lstop. Step 340: The CPU obtains the radius R(px) of curvature at the point px in a section from the deceleration start position Pd to the vehicle stop position Pstop from the map database 22 via the navigation ECU 20. In the map database 22, the radius of curvature is set per section of the road.

Step 345: The CPU obtains the lower limit vehicle speed SL(px) at the point px by applying the radius R(px) of curvature to a lookup table MapSL(R) shown in a block B1 of FIG. 3. According to the table MapSL(R), a higher value of the lower limit vehicle speed SL(px) is obtained as the radius R(px) of curvature is reduced. Note that, because the radius of curvature is set per section of the road in the map database 22, the lower limit vehicle speed SL(px) is also obtained per section of the road. In other words, the lower limit vehicle speed SL(px) does not change (is a constant value) in the same section of the road.

Next, the processing proceeds to step 350, and the CPU determines whether the point px at which the vehicle speed SPD(px) becomes lower than the lower limit vehicle speed SL(px) exists. If the point px at which the vehicle speed SPD(px) becomes lower than the lower limit vehicle speed SL(px) does not exist (see FIG. 2A), the CPU determines "No" in step 350, the processing proceeds to step 355, and the CPU determines whether the current position Pnow of the host vehicle matches the deceleration start position Pd. In this case, the current position Pnow matches the deceleration start position Pd due to the processing in above step 325. Thus, the CPU determines "Yes" in step 355, the processing proceeds to step 360, and the CPU starts decelerating the host vehicle at the constant deceleration Dec. Note that, when the value of the flag Xijo is "1", the CPU automatically executes the above-described lane keeping assist control (LKA). This point is the same in the other embodiments.

If the CPU executes the processing in step 305 again in this state, the CPU determines "No" in step 305, the processing proceeds to step 310, and the CPU determines "Yes" in step 310. Then, the processing proceeds to step 365, and the CPU determines whether it is a time point before the host vehicle starts being decelerated at the constant deceleration Dec (before deceleration start). At this time point, the host vehicle is decelerated. Thus, the CPU determines "No" in step 365, the processing directly proceeds to step 395, and this routine is terminated once.

On the other hand, if the point px at which the vehicle speed SPD(px) becomes lower than the lower limit vehicle speed SL(px) exists at a time point at which the CPU executes the processing in step 350 (see the broken line in FIG. 2B), the CPU determines "Yes" in step 350, the processing proceeds to step 375, and the CPU sets the deceleration start position Pd at a position at which the vehicle advances by a distance Z. Thereafter, the CPU repeats the processing from step 330 to step 350. Then, if it is determined in step 350 that the point px at which the vehicle speed SPD(px) becomes lower than the lower limit vehicle speed SL(px) still exists, the CPU sets the deceleration start position Pd at a position at which the vehicle further advances by the distance Z in the processing in step 375 and repeats the processing from step 330 to step 350. If the CPU determines that the point px at which the vehicle speed SPD(px) becomes lower than the lower limit vehicle speed SL(px) no longer exists after such processing, the processing proceeds from step 350 to step 355.

At this time point, the current position Pnow does not match the deceleration start position Pd. Thus, the CPU determines "No" in step 355, the processing directly proceeds to step 395, and this routine is terminated once. Thereafter, when the processing proceeds to step 305 again, the CPU determines "No" in step 305, determines "Yes" in following step 310, and further determines "Yes" in following step 365. Then, the processing proceeds to step 370. In step 370, the CPU makes the host vehicle travel at a constant speed so as to keep the vehicle speed at the time point. Thereafter, the processing proceeds to step 355. Accordingly, at the time point at which the current position Pnow of the host vehicle matches the deceleration start position Pd, the CPU determines "Yes" in step 355, the processing proceeds to step 360, and the CPU starts decelerating the host vehicle.

Figure 4:
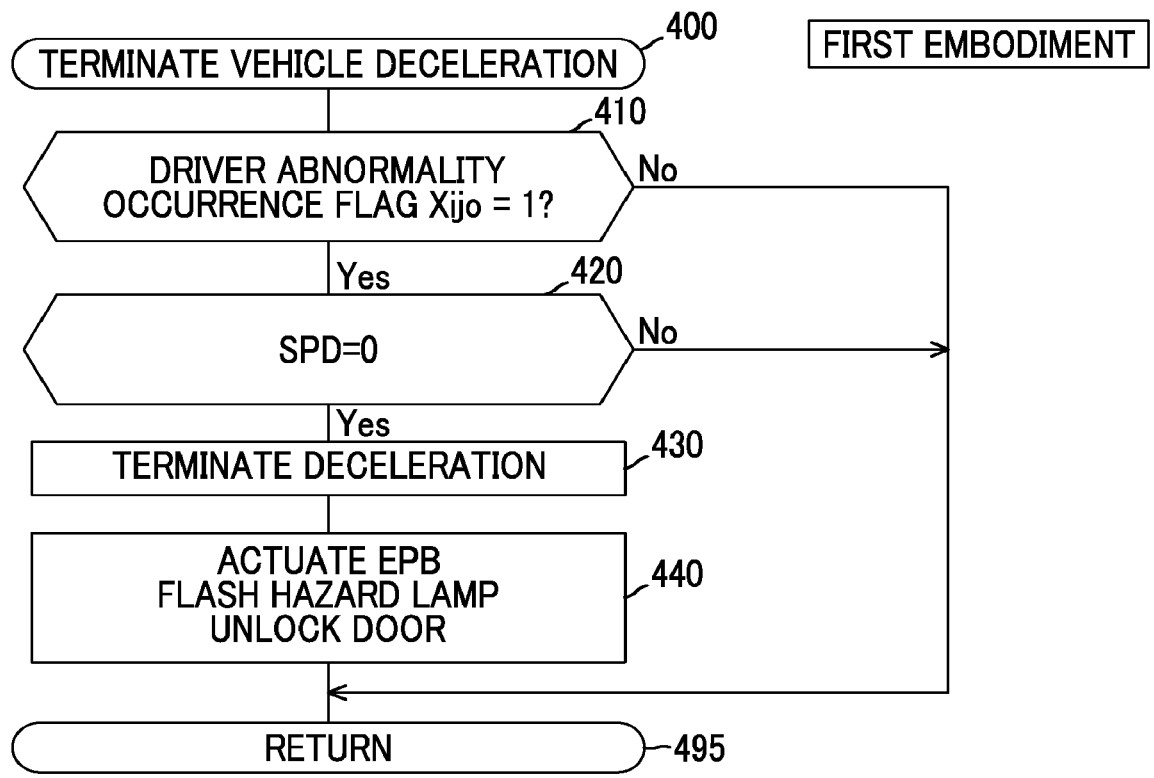
FIG. 4 is a flowchart of a routine that is executed by the CPU of the first apparatus.

Vehicle Deceleration Termination Processing At further specified timing, the CPU starts processing from step 400 in FIG. 4, the processing proceeds to step 410, and the CPU determines whether the value of the flag Xijo is "1". If the value of the flag Xijo is not "1" (if "0"), the CPU determines "No" in step 410, the processing directly proceeds to step 495, and this routine is terminated once.

On the other hand, if the value of the flag Xijo is "1", the CPU determines "Yes" in step 410, the processing proceeds to step 420, and the CPU determines whether the vehicle speed SPD of the host vehicle is "0" (that is, whether the host vehicle is stopped). If the vehicle speed SPD is not "0", the CPU determines "No" in step 420, the processing directly proceeds to step 495, and this routine is terminated once.

On the other hand, if the vehicle speed SPD is "0", the CPU determines "Yes" in step 420 and sequentially executes processing in step 430 and step 440, which will be described below. Then, the processing proceeds to step 495, and this routine is terminated once.

Step 430: The CPU stops the deceleration of the host vehicle. Step 440: The CPU adds the parking braking force to the wheels by using the EPB ECU 50. That is, the drive assist ECU 10 keeps the host vehicle in the stopped state. Furthermore, the CPU flashes the hazard lamp 71 by using the meter ECU 70 and unlocks a door of the vehicle by using a door lock ECU, which is not shown.

Figure 5:
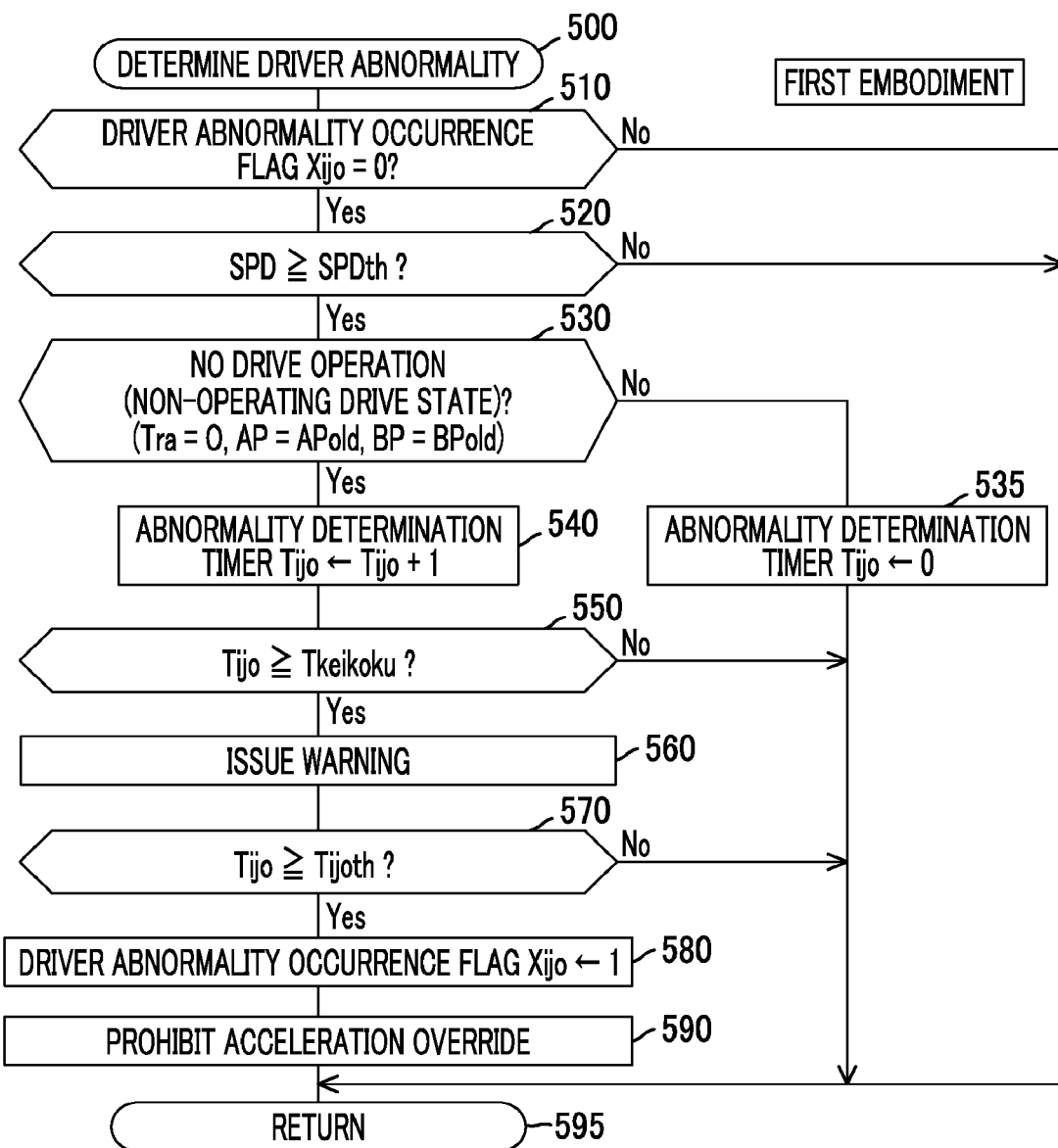
FIG. 5 is a flowchart of a routine that is executed by the CPU of the first apparatus.

Driver Abnormality Determination At specified timing, the CPU starts processing from step 500 in FIG. 5, the processing proceeds to step 510, and determines whether the value of the flag Xijo is "0". If the value of the driver abnormality occurrence flag Xijo is not "0" (if "1"), the CPU determines "No" in step 510, the processing directly proceeds to step 595, and this routine is terminated once.

On the other hand, if the value of the flag Xijo is "0", the CPU determines "Yes" in step 510, the processing proceeds to step 520, and the CPU determines whether the vehicle speed SPD is equal to or higher than the specified vehicle speed (an abnormality determination permitting vehicle speed, a forcible deceleration permitting vehicle speed) SPDth. If the vehicle speed SPD is not equal to or higher than the specified vehicle speed SPDth, the CPU determines "No" in step 520, the processing directly proceeds to step 595, and this routine is terminated once. At this time, the CPU may set a value of an abnormality determination timer Tijo, which will be described below, to "0". Note that the specified vehicle speed SPDth is set to a higher value than a maximum value of the lower limit vehicle speed.

On the other hand, if the vehicle speed SPD is equal to or higher than the specified vehicle speed SPDth, the CPU determines "Yes" in step 520, the processing proceeds to step 530, and the CPU determines whether a current time point corresponds to a non-operating drive state (a no drive operation state). The non-operating drive state is a state where none of the parameters, each of which has a combination of one or more of "the accelerator pedal operation amount AP, the brake pedal operation amount BP, the steering torque Tra, and the signal level of the stop lamp switch 13", is changed by the driver. In this example, the CPU regards the state where none of "the accelerator pedal operation amount AP, the brake pedal operation amount BP, and the steering torque Tra" is changed as the non-operating drive state.

If the current time point does not correspond to the non-operating drive state, the CPU determines "No" in step 530, the processing proceeds to step 535, and the CPU sets the value of the abnormality determination timer Tijo to "0". Thereafter, the processing directly proceeds to step 595, and this routine is terminated once.

On the other hand, if the current time point corresponds to the non-operating drive state, the CPU determines "Yes" in step 530, the processing proceeds to step 540, and the CPU increases the value of the abnormality determination timer Tijo by "1". Accordingly, the value of the abnormality determination timer Tijo represents duration of the non-operating drive state.

Next, the processing proceeds to step 550, and the CPU determines whether the value of the abnormality determination timer Tijo is equal to or longer than a warning start threshold time Tkeikoku. If the value of the abnormality determination timer Tijo is shorter than the warning start threshold time Tkeikoku, the CPU determines "No" in step 550, the processing directly proceeds to step 595, and this routine is terminated once.

On the other hand, if the value of the abnormality determination timer Tijo is equal to or longer than the warning start threshold time Tkeikoku, the CPU determines "Yes" in step 550, and the processing proceeds to step 560. The CPU causes the buzzer 81 to generate warning sound, flashes the "warning lamp" on the indicator 82, and displays the warning message to urge an operation of any of "the accelerator pedal 11a, the brake pedal 12a, and the steering wheel SW".

Next, the processing proceeds to step 570, and the CPU determines whether the value of the abnormality determination timer Tijo is equal to or longer than a driver abnormality determination threshold time Tijoth. The driver abnormality determination threshold time Tijoth is set as a longer time than the warning start threshold time Tkeikoku. If the value of the abnormality determination timer Tijo is shorter than the driver abnormality determination threshold time Tijoth, the CPU determines "No" in step 570, the processing directly proceeds to step 595, and this routine is terminated once.

On the other hand, if the value of the abnormality determination timer Tijo is equal to or longer than the driver abnormality determination threshold time Tijoth, the CPU determines "Yes" in step 570, the process proceeding to step 580, and the CPU sets the value of the driver abnormality occurrence flag Xijo to "1". Next, the processing proceeds to step 590, and the CPU prohibits acceleration (including the deceleration) of the vehicle based on a change in the accelerator pedal operation amount AP even when the accelerator pedal operation amount AP is changed. That is, the CPU prohibits acceleration override. Then, the processing proceeds to step 595, and this routine is terminated once. Just as described, when the non-operating drive state continues for the warning start threshold time Tkeikoku or longer, the warning to urge the driver to perform the drive operation is issued. Then, when the non-operating drive state continues for the driver abnormality determination threshold time Tijoth or longer, such a determination that the driver is in the driving incapable abnormal state is confirmed, and the value of the flag Xijo is set to "1".

As it has been described so far, the first apparatus decelerates the deceleration target vehicle while controlling the vehicle speed of the deceleration target vehicle such that the vehicle speed of the deceleration target vehicle from the abnormality determination time point to the time point at which the deceleration target vehicle is stopped does not become lower than the lower limit vehicle speed, which is set in accordance with the radius of curvature indicative of the road shape on which the deceleration target vehicle travels (the road shape on which the deceleration target vehicle travels and the road shape that influences the timing at which the driver of the vehicle behind the deceleration target vehicle recognizes the deceleration target vehicle). Furthermore, the first apparatus sets the lower limit vehicle speed to the higher value as the radius of curvature is reduced.

In addition, the first apparatus determines a deceleration start point such that the vehicle speed until the stop of the deceleration target vehicle does not fall below the lower limit vehicle speed, which is set per section of the road, even when the deceleration target vehicle is decelerated at the constant deceleration at the abnormality determination time point onward.

Accordingly, when the deceleration target vehicle travels on the curved road with the poor visibility, the vehicle speed of the deceleration target vehicle is not excessively reduced. Thus, even when the timing at which the driver of the vehicle behind recognizes the deceleration target vehicle is delayed, the vehicle behind can be decelerated without abruptly braking the vehicle behind.

Second Embodiment

Figure 6:
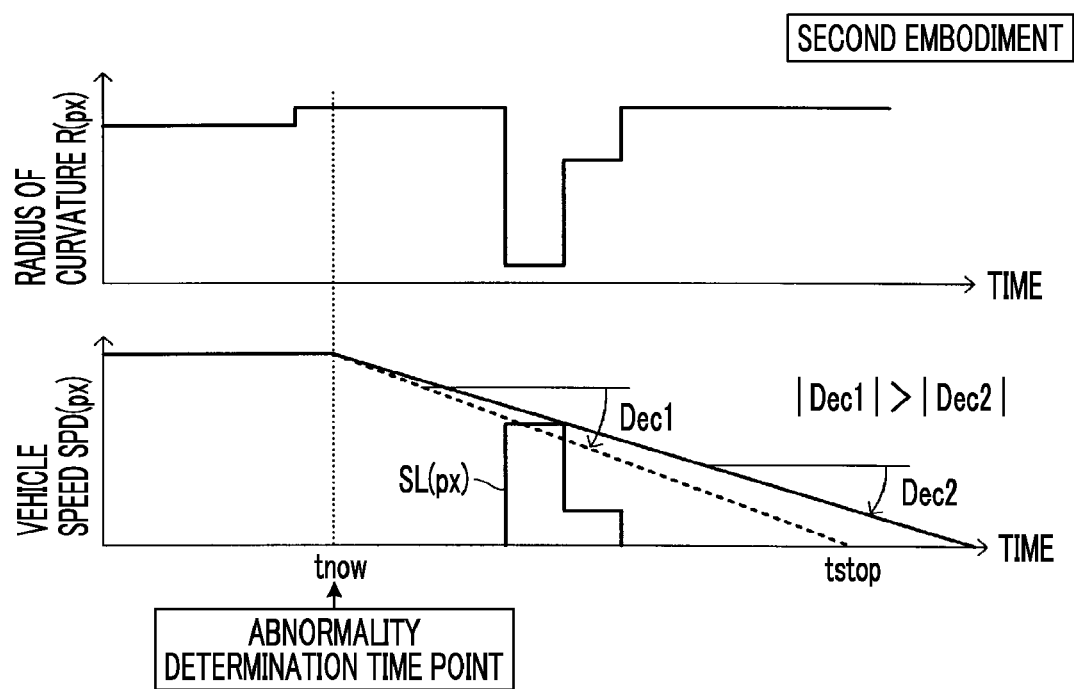
FIG. 6 is a time chart for explaining actuation of a vehicle travel control apparatus (a second apparatus) according to a second embodiment of the disclosure.

Next, a description will be made on a vehicle travel control apparatus (hereinafter may be referred to as a "second apparatus") according to a second embodiment of the disclosure. Similar to the first apparatus, when determining that the driver is in the driving incapable abnormal state, the second apparatus determines whether the point px at which the vehicle speed SPD(px) becomes lower than the lower limit vehicle speed SL(px) exists from the time at which the host vehicle starts being decelerated at the constant deceleration Dec to the time at which the host vehicle is stopped. Then, in the case where the point px, at which the vehicle speed SPD(px) becomes lower than the lower limit vehicle speed SL(px), exists as indicated by a broken line in FIG. 6, the second apparatus reduces a magnitude of the deceleration at the time of decelerating the host vehicle as indicated by a solid line in FIG. 6. In this way, the second apparatus decelerates the host vehicle at the reduced deceleration such that the vehicle speed SPD(px) does not become lower than the lower limit vehicle speed SL(px) until the stop of the host vehicle. According to this, the driver of the vehicle behind can also decelerate or stop the vehicle behind without abruptly braking the vehicle behind when recognizing the host vehicle. What has been described so far is the overview of actuation of the second apparatus.

(Specific Actuation) Next, a description will be made on specific actuation of the CPU in the ECU 10 according to the second apparatus. The CPU executes the routines shown in the flowcharts of FIG. 7 which replaces FIG. 3, FIG. 4, and FIG. 5 every time a specified time elapses. Because the flowcharts of FIG. 4 and FIG. 5 have already been described, a description will hereinafter be made on actuation (vehicle deceleration start processing) based on the flowchart of FIG. 7.

Figure 7:
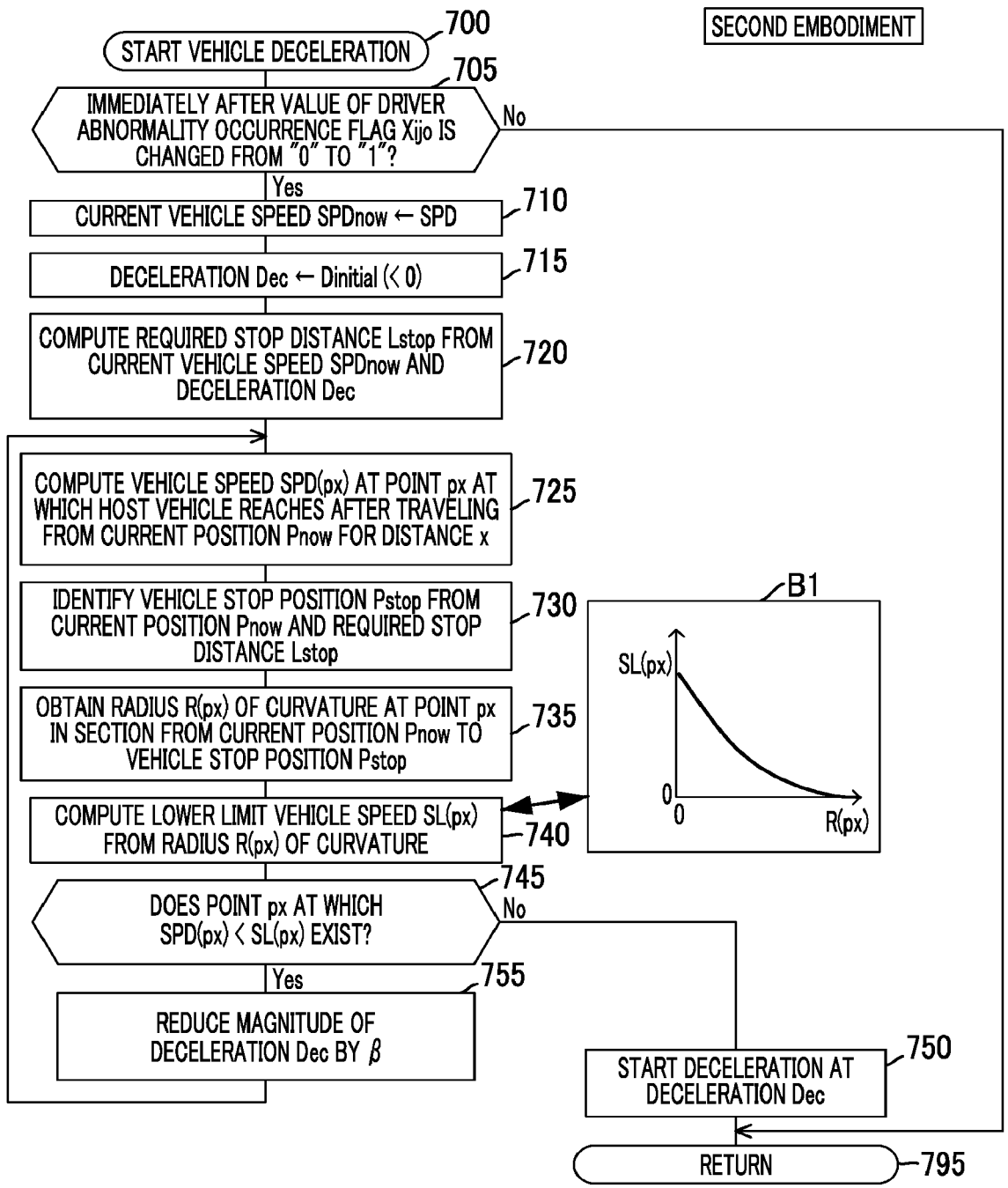
FIG. 7 is a flowchart of a routine that is executed by a CPU of the second apparatus.

At the specified timing, the CPU starts processing from step 700 in FIG. 7, the processing proceeds to step 705, and the CPU determines whether a current time point is immediately after the value of the driver abnormality occurrence flag Xijo is changed from "0" to "1". If the driver does not fall in the driving incapable abnormal state after the start of driving of the host vehicle of this time, the value of the flag Xijo is "0". In this case, the CPU determines "No" in step 705, the processing directly proceeds to step 795, and this routine is terminated once. Thus, in this case, the host vehicle is not forcibly decelerated.

On the other hand, if it is determined that the driver falls in the driving incapable abnormal state after the start of driving of the host vehicle of this time, the value of the flag Xijo is changed from "0" to "1". In this case, the CPU determines "Yes" in step 705 and sequentially executes processing from step 710 to step 740, which will be described below. Then, the processing proceeds to step 745.

Step 710: The CPU stores the vehicle speed SPD that is obtained on the basis of the signal from the vehicle speed sensor 16 as the current vehicle speed SPDnow. Step 715: The CPU stores (sets) an initial value Dinitial as the deceleration Dec. Step 720: Under the assumption that the vehicle is decelerated from the current vehicle speed SPDnow while keeping the constant deceleration Dec, the CPU computes the required stop distance Lstop, which is described above, on the basis of the current vehicle speed SPDnow and the constant deceleration Dec. Step 725: The CPU obtains the current position Pnow of the host vehicle from the navigation ECU 20. Then, under the assumption that the host vehicle is decelerated from the current vehicle speed SPDnow while keeping the constant deceleration Dec, the CPU computes the vehicle speed SPD(px) at the point px that is a point in a section from the current position Pnow to a point separated therefrom by the required stop distance Lstop and is also a point at which the host vehicle reaches after traveling from the current position Pnow for the distance x.

Step 730: The CPU identifies the vehicle stop position Pstop of the host vehicle from the current position Pnow of the host vehicle and the required stop distance Lstop. Step 735: The CPU obtains the radius R(px) of curvature at the point px in a section from the current position Pnow of the host vehicle to the vehicle stop position Pstop from the map database 22 via the navigation ECU 20. As described above, in the map database 22, the radius of curvature is set per section of the road. Step 740: The CPU obtains the lower limit vehicle speed SL(px) at the point px by applying the radius R(px) of curvature to the lookup table MapSL(R) shown in a block B1 of FIG. 7. According to the table MapSL(R), the higher value of the lower limit vehicle speed SL(px) is obtained as the radius R(px) of curvature is reduced. Note that, as described above, the lower limit vehicle speed SL(px) is obtained per section of the road.

Next, the processing proceeds to step 745, and the CPU determines whether the point px at which the vehicle speed SPD(px) becomes lower than the lower limit vehicle speed SL(px) exists. If the point px at which the vehicle speed SPD(px) becomes lower than the lower limit vehicle speed SL(px) does not exist (see FIG. 2A), the CPU determines "No" in step 745, the processing proceeds to step 750, and the CPU starts decelerating the host vehicle at the constant deceleration Dec.

On the other hand, if the point px at which the vehicle speed SPD(px) becomes lower than the lower limit vehicle speed SL(px) exists (see the broken line in FIG. 6), the CPU determines "Yes" in step 745, the processing proceeds to step 755, and the CPU reduces the magnitude of the deceleration Dec by a positive value β. Thereafter, the CPU repeats the processing from step 720 to step 745. As a result of this, if the point px at which the vehicle speed SPD(px) becomes lower than the lower limit vehicle speed SL(px) no longer exists, the processing proceeds from step 745 to step 750, and the CPU starts decelerating the host vehicle at the constant deceleration Dec whose magnitude is reduced by the positive value β. Note that step 755 is repeatedly executed unless it is determined "No" in step 745. Thus, the magnitude of the deceleration Dec is gradually reduced.

As it has been described so far, similar to the first apparatus, the second apparatus decelerates the deceleration target vehicle while controlling the vehicle speed of the deceleration target vehicle such that the vehicle speed of the deceleration target vehicle from the abnormality determination time point to the time point at which the deceleration target vehicle is stopped does not become lower than the lower limit vehicle speed, which is set in accordance with the radius of curvature indicative of the road shape on which the deceleration target vehicle travels. Furthermore, the second apparatus sets the lower limit vehicle speed to the higher value as the radius of curvature is reduced.

In addition, the second apparatus determines the deceleration at which the vehicle speed until the stop of the deceleration target vehicle does not fall below the lower limit vehicle speed, which is set per section of the road. Then, the second apparatus decelerates the deceleration target vehicle while keeping the deceleration.

Accordingly, when the deceleration target vehicle travels on the curved road with the poor visibility, the vehicle speed of the deceleration target vehicle is not excessively reduced. Thus, even when the timing at which the driver of the vehicle behind recognizes the deceleration target vehicle is delayed, the vehicle behind can be decelerated without abruptly braking the vehicle behind.

Third Embodiment

Next, a description will be made on a vehicle travel control apparatus (hereinafter may be referred to as a "third apparatus") according to a third embodiment of the disclosure. When determining that the driver is in the driving incapable abnormal state, the third apparatus obtains information on a road shape between the current position Pnow and a tentative stop position Ptstop that is ahead of the current position Pnow by a sufficient distance to stop the vehicle (hereinafter referred to as a "maximum predicted stop distance") from the map database 22 via the navigation ECU 20. This information on the road shape also includes the radius R of curvature per section of the road between the current position Pnow and the tentative stop position Ptstop. In other words, the ECU 10 obtains the radius R(px) of curvature of the road at the point px. Next, the third apparatus computes the lower limit vehicle speed SL(px) at the point px on the basis of the radius R(px) of curvature.

Figure 8:
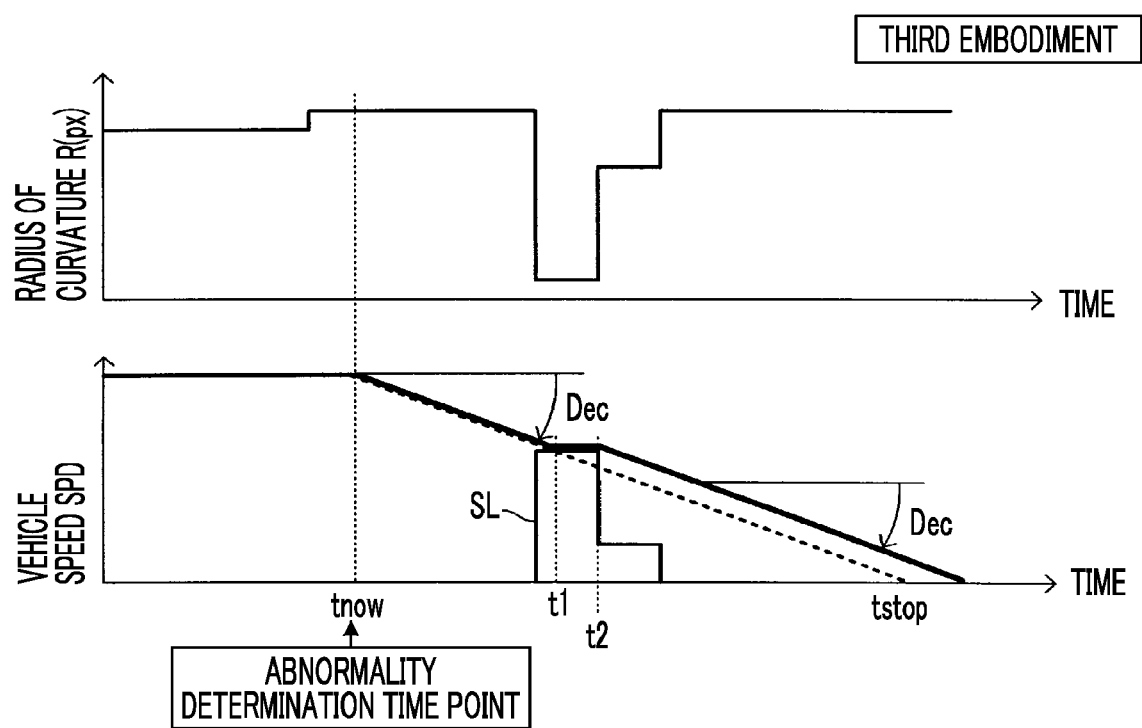
FIG. 8 is a time chart for explaining actuation of a vehicle travel control apparatus (a third apparatus) according to a third embodiment of the disclosure.

Then, the third apparatus computes a vehicle speed SL(px) at the point px in a case where the host vehicle is decelerated at the constant deceleration Dec. In the case where it is predicted that the vehicle speed SL(px) becomes lower than the lower limit vehicle speed SL(px), the deceleration of the host vehicle is temporarily stopped to keep the vehicle speed (see a solid line in FIG. 8) in a period in which the vehicle speed SL(px) becomes lower than the lower limit vehicle speed SL(px) (see a broken line in FIG. 8 and a period from time t1 to time t2). Thereafter, when the vehicle speed SL(px) is brought into a state of being equal to or higher than the lower limit vehicle speed SL(px), the third apparatus decelerates the host vehicle at the constant deceleration Dec again. The third apparatus obtains a target vehicle speed SPDtgt, at which the host vehicle is decelerated just as described, through calculation at the abnormality determination time point. Then, at the abnormality determination time point onward, the third apparatus gradually decelerates the host vehicle such that the vehicle speed SPD of the host vehicle matches the target vehicle speed SPDtgt. According to this, the driver of the vehicle behind can also decelerate or stop the vehicle behind without abruptly braking the vehicle behind when recognizing the host vehicle. What has been described so far is the overview of actuation of the third apparatus.

(Specific Actuation) Next, a description will be made on specific actuation of the CPU in the ECU 10 according to the third apparatus. The CPU executes the routines shown in the flowcharts of FIG. 9 which replaces FIG. 3, FIG. 4, and FIG. 5 every time a specified time elapses. Because the flowcharts of FIG. 4 and FIG. 5 have already been described, a description will hereinafter be made on actuation (vehicle deceleration processing) based on the flowchart of FIG. 9.

Figure 9:
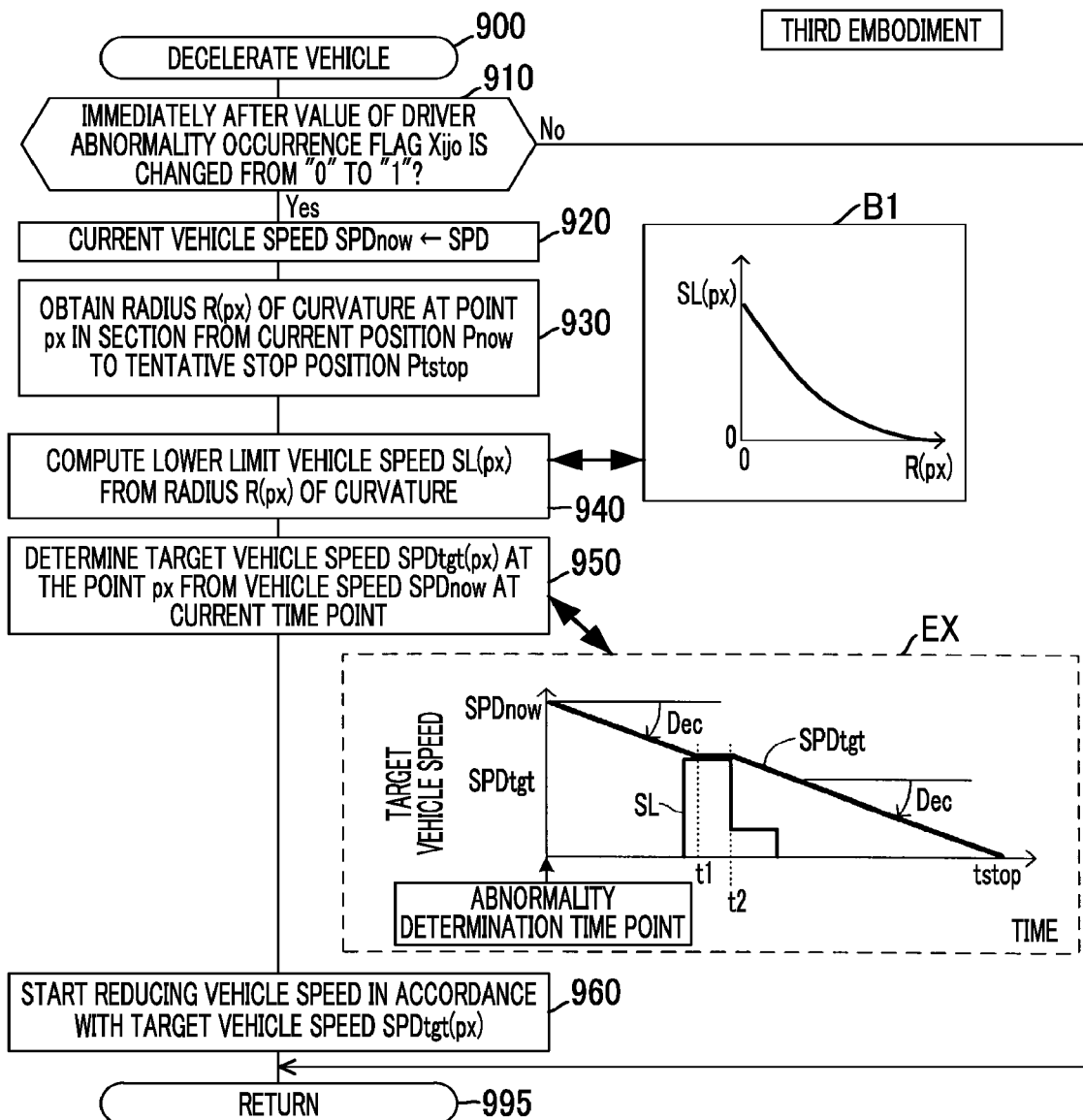
FIG. 9 is a flowchart of a routine that is executed by a CPU of the third apparatus.

At specified timing, the CPU starts the processing from step 900 in FIG. 9, the processing proceeds to step 910, and the CPU determines whether a current time point is immediately after the value of the driver abnormality occurrence flag Xijo is changed from "0" to "1". If the driver does not fall in the driving incapable abnormal state after the start of driving of the host vehicle of this time, the value of the flag Xijo is "0". In this case, the CPU determines "No" in step 910, the processing directly proceeds to step 995, and this routine is terminated once. Thus, in this case, the host vehicle is not forcibly decelerated.

On the other hand, if a time point at which the CPU executes the processing in step 910 is immediately after the value of the flag Xijo is changed from "0" to "1", the CPU determines "Yes" in step 910 and sequentially executes processing from step 920 to step 960, which will be described below. Then, the processing proceeds to step 995, and this routine is terminated once.

Step 920: The CPU stores the vehicle speed SPD that is obtained on the basis of the signal from the vehicle speed sensor 16 as the current vehicle speed SPDnow. Step 930: The CPU obtains the radius R(px) of curvature at the point px in a section from the current position Pnow of the host vehicle to the above-described tentative stop position Ptstop from the map database 22 via the navigation ECU 20. As described above, in the map database 22, the radius of curvature is set per section of the road.

Step 940: The CPU obtains the lower limit vehicle speed SL(px) at the point px by applying the radius R(px) of curvature to the lookup table MapSL(R) shown in a block B1 of FIG. 9. According to the table MapSL(R), the higher value of the lower limit vehicle speed SL(px) is obtained as the radius R(px) of curvature is reduced. As described above, the lower limit vehicle speed SL(px) is obtained per section of the road. Step 950: Under assumption that the vehicle is decelerated from the current vehicle speed SPDnow at the constant deceleration Dec, the CPU determines the target vehicle speed SPDtgt by the above-described method (see a time chart in a block Ex of FIG. 9).

Step 960: The CPU executes required processing so as to gradually reduce the vehicle speed SPD of the host vehicle in accordance with the target vehicle speed SPDtgt, which is determined in step 950. As a result of this, in an example shown in the time chart in the block Ex of FIG. 9, the host vehicle travels at the constant speed from time t1 to time t2; however, the host vehicle is decelerated while keeping the constant deceleration Dec in the other period.

As it has been described so far, the third apparatus decelerates the deceleration target vehicle at the constant deceleration at the abnormality determination time point onward. In a period from the abnormality determination time point to the time point at which the deceleration target vehicle is stopped, the deceleration of the deceleration target vehicle is temporarily interrupted, and the vehicle speed thereof is kept (the vehicle travels at the constant speed) in a period in which the vehicle speed of the deceleration target vehicle is expected to become lower than the lower limit vehicle speed, which is set per section of the road. The host vehicle is decelerated at the constant deceleration in a period in which the host vehicle does not travel at the constant speed.

Thus, it is possible to prevent the vehicle speed of the deceleration target vehicle from falling below the lower limit vehicle speed. It is also possible to continue the deceleration of the deceleration target vehicle when the vehicle speed of the deceleration target vehicle is higher than the lower limit vehicle speed. As a result, the vehicle speed of the deceleration target vehicle can be reduced to be as low as possible while the vehicle speed of the deceleration target vehicle is prevented from falling below the lower limit vehicle speed.

Fourth Embodiment

Next, a description will be made on a vehicle travel control apparatus (hereinafter may be referred to as a "fourth apparatus") according to a fourth embodiment of the disclosure. The fourth apparatus calculates the radius of curvature of the road, on which the host vehicle travels, on the basis of the image data (the road image data) obtained by the camera device 17b, and determines the lower limit vehicle speed on the basis of the radius of curvature.

By the way, a radius of curvature of a road on which the host vehicle will travel in the future can be obtained (obtained in advance) on the basis of the road image data obtained by the camera device 17b when the road is located in front of the host vehicle and is located within a specified distance L from the host vehicle. Accordingly, the fourth apparatus changes a travel state of the host vehicle on the basis of a future vehicle speed of the host vehicle and the radius of curvature of the road on which the host vehicle will travel in the future.

A description will hereinafter be made on characteristic actuation of the fourth apparatus on the basis of examples shown in FIG. 10A to FIG. 10D and FIG. 11A to FIG. 11D. Note that, in FIG. 10A to FIG. 10D and FIG. 11A to FIG. 11D, solid lines indicate "the radius of curvature, the vehicle speed, and the lower limit vehicle speed" up to the current time point, broken lines indicate "the radius of curvature and the lower limit vehicle speed of the road on which the host vehicle will travel at a future time point" obtained by using the camera device 17b, and one-dot chain lines indicate the future vehicle speed (a predicted vehicle speed) of the host vehicle. FIG. 10A to FIG. 10D are time charts, and the actuation of the fourth apparatus is changed from FIG. 10A to FIG. 10B, FIG. 10C, and FIG. 10D along with a lapse of time. Similarly, FIG. 11A to FIG. 11D are time charts, and the actuation of the fourth apparatus is changed from FIG. 11A to FIG. 11B, FIG. 11C, and FIG. 11D along with the lapse of the time.

Example 1

As indicated by the broken line in FIG. 10A, in the case where a future radius of curvature that can be obtained at the abnormality determination time point is relatively large, the lower limit vehicle speed remains as the low vehicle speed. Accordingly, as indicated by the one-dot chain line, even when the host vehicle is decelerated at the constant deceleration from the abnormality determination time point, the future vehicle speed does not become lower than the lower limit vehicle speed. Thus, in this case, the fourth apparatus starts decelerating the host vehicle at the constant deceleration from the abnormality determination time point.

Thereafter, as shown in FIG. 10B, when the current time point becomes a time point t1, it is assumed that an abrupt reduction in the radius of curvature at a certain time point t3 in the future and an abrupt increase in the lower limit vehicle speed as a result are predicted. In this case, the vehicle speed of the host vehicle at the time point t1 is higher than the lower limit vehicle speed at the time point t3. However, in the case where the host vehicle keeps being decelerated at the constant deceleration, it is predicted that the vehicle speed becomes lower than the lower limit vehicle speed at the time point t3. Accordingly, as shown in FIG. 10C, the fourth apparatus temporarily stops the deceleration at the time point t1, at which such a prediction is made, makes the host vehicle travel at the constant speed, and thereby keeps the vehicle speed.

Thereafter, the fourth apparatus predicts that the vehicle speed does not become lower than the lower limit vehicle speed in the future even when decelerating the host vehicle at the constant deceleration (see a time point t2 in FIG. 10C). At this time, the fourth apparatus starts decelerating the host vehicle again at the constant deceleration. As a result, as shown in FIG. 10D, the vehicle speed is reduced without falling below the lower limit vehicle speed and eventually becomes "0".

Example 2

As indicated by the broken line in FIG. 11A, in the case where the future radius of curvature that can be obtained at the abnormality determination time point is relatively large, the lower limit vehicle speed remains as the low vehicle speed. Accordingly, as indicated by the one-dot chain line, even when the host vehicle is decelerated at the constant deceleration from the abnormality determination time point, the future vehicle speed does not become lower than the lower limit vehicle speed. Thus, in this case, the fourth apparatus starts decelerating the host vehicle at the constant deceleration from the abnormality determination time point.

Thereafter, as shown in FIG. 11B, when the current time point becomes the time point t1, it is assumed that the abrupt reduction in the radius of curvature at the certain time point t3 in the future and the abrupt increase in the lower limit vehicle speed as a result are predicted. In this case, the vehicle speed of the host vehicle at the time point t1 is already lower than the lower limit vehicle speed at the time point t3. Thus, in the case where the host vehicle keeps being decelerated at the constant deceleration, it is predicted that the vehicle speed naturally becomes lower than the lower limit vehicle speed at the time point t3. Accordingly, as shown in FIG. 11C, the fourth apparatus temporarily stops the deceleration at the time point t1, at which such a prediction is made, and accelerates the host vehicle at specified acceleration. This specified acceleration is acceleration that is calculated such that the vehicle speed of the host vehicle reaches a higher vehicle speed than the lower limit vehicle speed that corresponds to the radius of curvature corresponding to the time point t3 (a value that is obtained by adding a constant vehicle speed to the lower limit vehicle speed) before the host vehicle reaches a point with the radius of curvature. Then, when the vehicle speed of the host vehicle reaches the lower limit vehicle speed at the point with the radius of curvature corresponding to the time point t3, the fourth apparatus makes the host vehicle travel at the constant speed (see the time point t2).

Thereafter, the fourth apparatus predicts that the vehicle speed does not become lower than the lower limit vehicle speed in the future even when decelerating the host vehicle at the constant deceleration (see a time point t4 in FIG. 11C and FIG. 11D). At this time, the fourth apparatus starts decelerating the host vehicle again at the constant deceleration. As a result, as shown in FIG. 11D, the vehicle speed is reduced without falling below the lower limit vehicle speed and eventually becomes "0".

(Specific Actuation) Next, a description will be made on specific actuation of the CPU in the ECU 10 according to the fourth apparatus. The CPU executes the routines shown in the flowcharts of FIG. 12 which replaces FIG. 3, FIG. 4, and FIG. 5 every time a specified time elapses. Because the flowcharts of FIG. 4 and FIG. 5 have already been described, a description will hereinafter be made on actuation (vehicle deceleration processing) based on the flowchart of FIG. 12.

Figure 12:
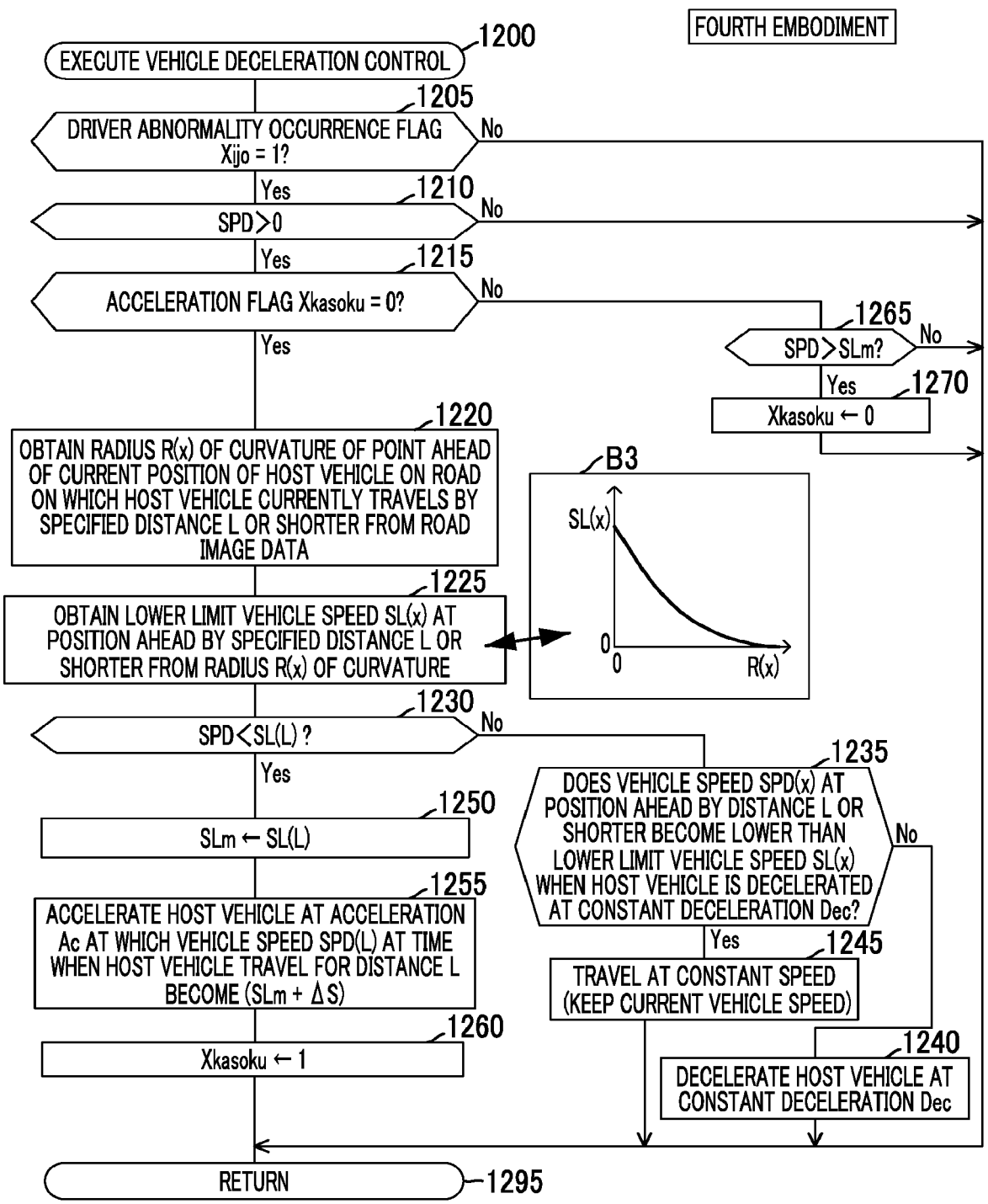
FIG. 12 is a flowchart of a routine that is executed by a CPU of the fourth apparatus.

At specified timing, the CPU starts the processing from step 1200 in FIG. 12, the processing proceeds to step 1205, and the CPU determines whether the value of the driver abnormality occurrence flag Xijo is "1". If the driver does not fall in the driving incapable abnormal state after the start of driving of the host vehicle of this time, the value of the flag Xijo is "0". In this case, the CPU determines "No" in step 1205, the processing directly proceeds to step 1295, and this routine is terminated once. Thus, in this case, the host vehicle is not forcibly decelerated.

On the other hand, if the value of the driver abnormality occurrence flag Xijo is "1" at a time point at which the CPU executes the processing in step 1205, the CPU determines "Yes" in step 1205, the processing proceeds to step 1210, and the CPU determines whether the vehicle speed SPD is higher than "0". If the vehicle speed SPD is "0", the CPU determines "No" in step 1210. Then, the processing directly proceeds to step 1295, and this routine is terminated once.

On the other hand, if the vehicle speed SPD is higher than "0", the CPU determines "Yes" in step 1210, the processing proceeds to step 1215, and the CPU determines whether a value of an acceleration flag Xkasoku is "0". When the value of the acceleration flag Xkasoku is "1", the acceleration flag Xkasoku indicates that the host vehicle is accelerated at the abnormality determination time point onward. The acceleration flag Xkasoku is set to "0" in the above-described initial routine is set to "1" in step 1260 which will be described below, and is further set to "0" in step 1270 which will be described below.

Here, if the current time point is immediately after the abnormality determination time point, the value of the acceleration flag Xkasoku is "0". Thus, the CPU determines "Yes" in step 1215 and sequentially executes processing from step 1220 to step 1225, which will be described below. Then, the processing proceeds to step 1230.

Step 1220: Based on the road image data obtained by the camera device 17b, the CPU calculates and obtains a radius R(x) of curvature of the road ahead of the road on which the host vehicle travels at the current time point (a radius of curvature of a position ahead of the current position of the host vehicle by a specified distance x). Note that a maximum value L of the specified distance x is a maximum distance with which the radius of curvature can be computed on the basis of the road image data obtained by the camera device 17b. Step 1225: The CPU determines a lower limit vehicle speed SL(x) that corresponds to the radius R(x) of curvature of the position ahead by the specified distance x by applying the radius R(x) of curvature to the lookup table MapSL(R) shown in a block B3 of FIG. 12. The distance x is equal to or longer than "0" and is equal to or shorter than "L" According to this table MapSL(R), the lower limit vehicle speed SL(x) is calculated to be increased as the radius R(x) of curvature is reduced.

Next, the processing proceeds to step 1230, and the CPU determines whether the vehicle speed SPD at the current time point is lower than a "lower limit vehicle speed SL(L) at the position ahead of the current position of the host vehicle by the specified distance L". The specified distance L is the maximum value of the above-described specified distance x. If the vehicle speed SPD at the current time point is equal to or higher than the lower limit vehicle speed SL(L), the CPU determines "No" in step 1230, and the processing proceeds to step 1235. Then, the CPU determines whether "vehicle speed SPD(x) at the position ahead of the current position of the host vehicle by the specified distance x (x is the distance that is equal to or longer than 0 and is equal to or shorter than the specified distance L)" becomes lower than the lower limit vehicle speed SL(x) in the case where the host vehicle is decelerated at the constant deceleration Dec. That is, the CPU determines whether a situation shown in FIG. 10B occurs.

If a determination condition is not established in step 1235, the CPU determines "No" in step 1235, the processing proceeds to step 1240, and the CPU decelerates the host vehicle at the constant deceleration Dec. On the other hand, if the determination condition of step 1235 is established, the CPU determines "Yes" in step 1235, the processing proceeds to step 1245, and the CPU makes the host vehicle travel at the constant speed so as to keep the current vehicle speed (see the time point t1 in FIG. 10C).

Thereafter, if such a state continues, the CPU determines "Yes" in all steps from step 1205 to step 1215, and the processing proceeds to step 1230 via step 1220 and step 1225. At this time point, the vehicle speed is kept to be constant. Accordingly, unless a road with a smaller radius of curvature appears, a situation where the determination condition of step 1230 is not established continues, and thus the CPU keeps determining "No" in step 1230. The CPU thereby repeats the determination in step 1235. Thus, at the time point t2 in FIG. 10C, the CPU determines "No" in step 1235, and the processing proceeds to step 1240. Then, the CPU starts decelerating the host vehicle again at the constant deceleration Dec.

By the way, at a time point at which the CPU executes the processing in step 1230 like the time point t1 in FIG. 11B, there is a case where the vehicle speed SPD at the current time point becomes lower than the lower limit vehicle speed SL(L). In the case where the host vehicle is decelerated at the constant deceleration Dec at this time, it is predicted that a vehicle speed SPD(L) at the position ahead of the current position of the host vehicle by the specified distance L naturally becomes lower than the lower limit vehicle speed SL(L). Accordingly, in this case, the CPU determines "Yes" in step 1230 and sequentially executes processing from step 1250 to step 1260, which will be described below. Then, the processing proceeds to step 1295, and this routine is terminated once.

Step 1250: The CPU stores the lower limit vehicle speed SL(L) that is used as the determination condition of step 1230 (that is, SL(L) of the lower limit vehicle speed SL(x) obtained in last step 1225) as a reference target vehicle speed SLm. Step 1255: Based on the vehicle speed SPD and the specified distance L at the time point, the CPU computes constant acceleration Ac at which the vehicle speed SPD(L) at the time when the host vehicle travels for the specified distance L can correspond to a "value (SLm+ΔS) that is obtained by adding a specified positive vehicle speed (margin) ΔS to the reference target vehicle speed SLm" and accelerates the host vehicle at the constant acceleration Ac. Step 1260: The CPU sets the value of the acceleration flag Xkasoku to "1".

If the CPU starts the processing from step 1200 again in this state, the CPU determines "Yes" in step 1205 and step 1210 and determines "No" in following step 1215, and the processing proceeds to step 1265. The CPU determines in step 1265 whether the vehicle speed SPD at the time point is higher than the reference target vehicle speed SLm. If the vehicle speed SPD at the time point is equal to or lower than the reference target vehicle speed SLm, the CPU determines "No" in step 1265. Then, the processing directly proceeds to step 1295, and this routine is terminated once. As a result of this, the host vehicle keeps being accelerated at the constant acceleration Ac.

As a result of the acceleration of the host vehicle, as shown at the time point t2 in FIG. 11C, if the vehicle speed SPD at the time point becomes higher than the reference target vehicle speed SLm, the CPU determines "Yes" in step 1265. Then, the processing proceeds to step 1270, and the CPU sets the value of the acceleration flag Xkasoku to "0".

Accordingly, when executing this routine next time, the CPU determines "Yes" in step 1215 and determines "No" in step 1230. Then, the processing proceeds to step 1235. Thus, the CPU keeps the constant travel by the processing in step 1245 until the CPU determines that the vehicle speed SPD(x) does not become lower than the lower limit vehicle speed SL(x) in the case where the host vehicle is decelerated at the constant deceleration Dec. If the CPU determines that the vehicle speed SPD(x) does not become lower than the lower limit vehicle speed SL(x) in the case where the host vehicle is decelerated at the constant deceleration Dec, the deceleration by the processing in step 1240 is resumed.

As it has been described so far, based on the image data obtained by the camera device 17b, the fourth apparatus obtains the radius of curvature (or curvature=1/the radius of curvature) of the road at the particular point that is ahead of the position of the vehicle at the current time point by the specified distance L.

Then, in the case where it is predicted that the vehicle speed at the time when the deceleration target vehicle reaches the particular point becomes lower than the lower limit vehicle speed, which is set on the basis of the radius of curvature (or the curvature) of the particular point, (including the case where the vehicle speed at the current time point is lower than the lower limit vehicle speed at the particular point) when the deceleration target vehicle keeps being decelerated, the fourth apparatus makes the deceleration target vehicle travel at the constant speed or accelerates the deceleration target vehicle, so as to keep the vehicle speed of the deceleration target vehicle at the time of reaching the particular point to be equal to or higher than the lower limit vehicle speed.

Thus, even when the information of the map database cannot be used, even when the information of the map database is old information, or the like, the fourth apparatus can gradually reduce the vehicle speed of the deceleration target vehicle while preventing the vehicle speed of the deceleration target vehicle from significantly falling below the lower limit vehicle speed.

Fifth Embodiment

Next, a description will be made on a vehicle travel control apparatus (hereinafter may be referred to as a "fifth apparatus") according to a fifth embodiment of the disclosure. When determining that the driver is in the driving incapable abnormal state, the fifth apparatus decelerates the host vehicle at the constant deceleration Dec, calculates a radius Rnow of curvature of the road at the position at which the host vehicle travels at the current time point on the basis of the road image data obtained by the camera device 17b, and determines a lower limit vehicle speed SLnow on the basis of the radius Rnow of curvature.

Then, in the case where the vehicle speed SPD becomes equal to or lower than the lower limit vehicle speed SLnow by the time the host vehicle is stopped, the fifth apparatus temporarily stops the deceleration and keeps or increases the vehicle speed. Thereafter, when the vehicle speed SPD is brought into a state of being higher than the lower limit vehicle speed SLnow, the fifth apparatus decelerates the host vehicle again at the constant deceleration Dec. According to this, the vehicle speed of the host vehicle does not significantly fall below the lower limit vehicle speed, either. Thus, when recognizing the host vehicle, the driver of the vehicle behind can decelerate or stop without abruptly braking the vehicle behind. What has been described so far is the overview of actuation of the fifth apparatus.

(Specific Actuation) Next, a description will be made on specific actuation of the CPU in the ECU 10 according to the fifth apparatus. The CPU executes the routines shown in the flowcharts of FIG. 13 which replaces FIG. 3, FIG. 4, and FIG. 5 every time a specified time elapses. Because the flowcharts of FIG. 4 and FIG. 5 have already been described, a description will hereinafter be made on actuation (vehicle deceleration processing) based on the flowchart of FIG. 13.

Figure 13:
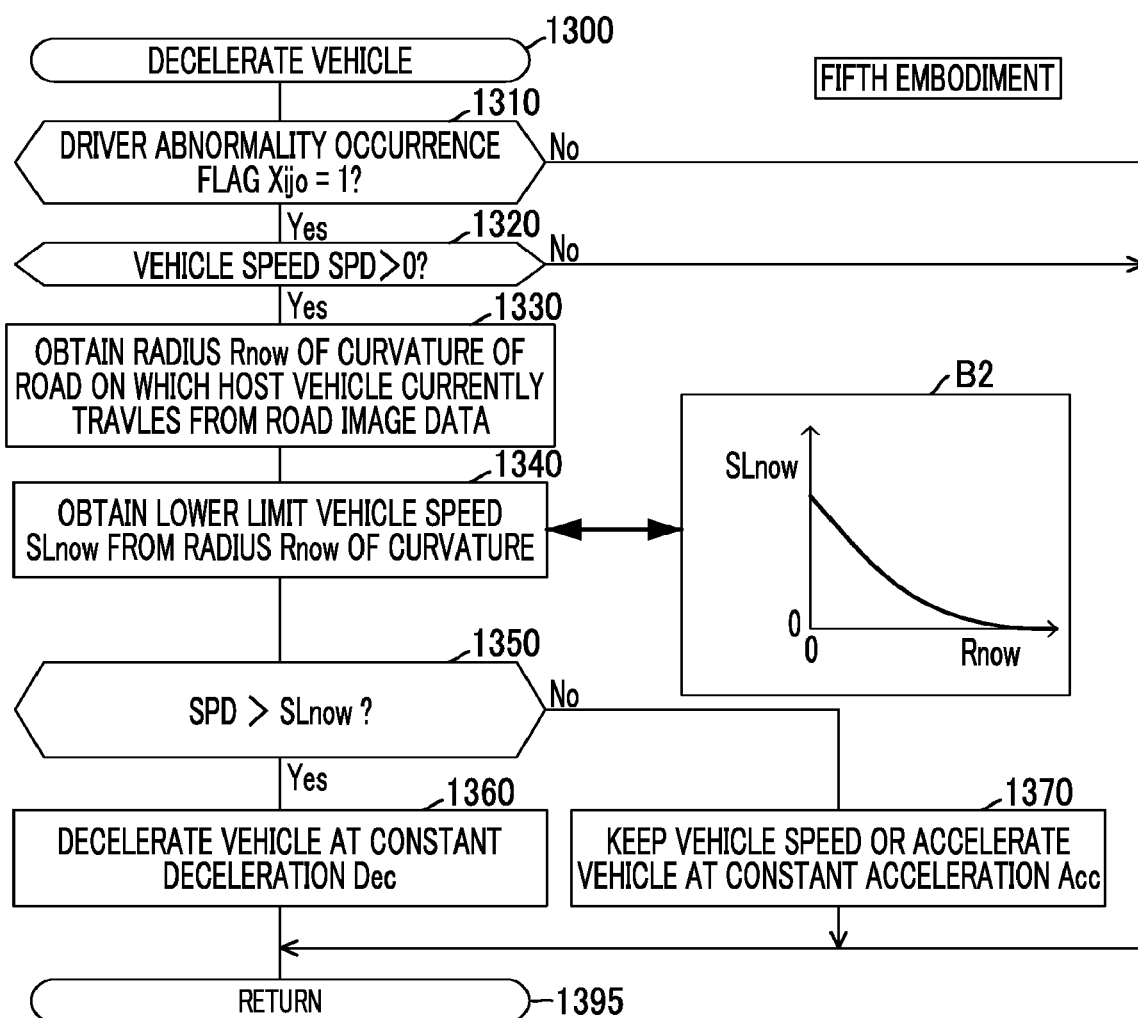
FIG. 13 is a flowchart of a routine that is executed by a CPU of a vehicle travel control apparatus (a fifth apparatus) according to a fifth embodiment of the disclosure.

At specified timing, the CPU starts the processing from step 1300 in FIG. 13, the processing proceeds to step 1310, and the CPU determines whether the value of the driver abnormality occurrence flag Xijo is "1". If the value of the flag Xijo is not "1", the CPU determines "No" in step 1310, the processing directly proceeds to step 1395, and this routine is terminated once. Thus, in this case, the host vehicle is not forcibly decelerated.

On the other hand, if the value of the driver abnormality occurrence flag Xijo is "1" at a time point at which the CPU executes the processing in step 1310, the CPU determines "Yes" in step 1310, the processing proceeds to step 1320, and the CPU determines whether the vehicle speed SPD is higher than "0". If the vehicle speed SPD is "0", the CPU determines "No" in step 1320. Then, the processing directly proceeds to step 1395, and this routine is terminated once.

On the other hand, if the vehicle speed SPD is higher than "0", the CPU determines "Yes" in step 1320 and sequentially executes processing in step 1330 and step 1340, which will be described below. Then, the processing proceeds to step 1350.

Step 1330: Based on the road image data obtained by the camera device 17b, the CPU calculates and obtains the radius Rnow of curvature of the road on which the host vehicle travels at the current time point. Step 1340: The CPU determines the lower limit vehicle speed SLnow at the current time point by applying the radius Rnow of curvature to a lookup table MapSLnow(Rnow) shown in a block B2 of FIG. 13. According to this table MapSLnow(Rnow), the lower limit vehicle speed SLnow is computed to be increased as the radius Rnow of curvature is reduced.

Next, the processing proceeds to step 1350, and the CPU determines whether the vehicle speed SPD at the current time point is higher than the lower limit vehicle speed SLnow at the current time point. If the vehicle speed SPD at the current time point is higher than the lower limit vehicle speed SLnow at the current time point, the CPU determines "Yes" in step 1350, the processing proceeds to step 1360, and the CPU decelerates the host vehicle at the constant deceleration Dec. Thereafter, the processing proceeds to 1395, and this routine is terminated once.

On the other hand, if the vehicle speed SPD at the current time point is equal to or lower than the lower limit vehicle speed SLnow at the current time point, the CPU determines "No" in step 1350, the processing proceeds to step 1370, and the CPU temporarily stops the deceleration at the constant deceleration Dec. In addition, if the vehicle speed SPD at the current time point is equal to the lower limit vehicle speed SLnow at the current time point, the CPU makes the host vehicle travel at the constant speed. If the vehicle speed SPD at the current time point is lower than the lower limit vehicle speed SLnow at the current time point, the CPU accelerates the host vehicle at constant acceleration Acc until the vehicle speed SPD of the host vehicle matches the lower limit vehicle speed SLnow. Thereafter, the processing proceeds to step 1395, and this routine is terminated once.

As it has been described so far, based on the image data obtained by the camera device 17b, the fifth apparatus obtains information on the radius of curvature of the road at the point on which the deceleration target vehicle travels at the "current time point". Then, the fifth apparatus sets the lower limit vehicle speed to a higher value as the radius of curvature indicated by the information on the radius of curvature is reduced. Furthermore, in the case where the vehicle speed of the deceleration target vehicle at the current time point is higher than the lower limit vehicle speed at the point at which the deceleration target vehicle travels at the current time point, the fifth apparatus decelerates the deceleration target vehicle. In the case where the vehicle speed of the deceleration target vehicle at the current time point is equal to the lower limit vehicle speed at the point at which the deceleration target vehicle travels at the current time point, the fifth apparatus makes the deceleration target vehicle travel at the constant speed. In the case where the vehicle speed of the deceleration target vehicle at the current time point is lower than the lower limit vehicle speed at the point at which the deceleration target vehicle travels at the current time point, the fifth apparatus accelerates the deceleration target vehicle or makes the deceleration target vehicle travel at the constant speed.

Accordingly, even when the information of the map database cannot be used, even when the information of the map database is the old information, or the like, the fifth apparatus can gradually reduce the vehicle speed of the deceleration target vehicle while preventing the vehicle speed of the deceleration target vehicle from significantly falling below the lower limit vehicle speed.

Modified Example of Fifth Embodiment

Next, a description will be made on a vehicle travel control apparatus (hereinafter may be referred to as a "fifth modified example apparatus") according to a modified example of the fifth embodiment of the disclosure. The fifth modified example apparatus differs from the fifth apparatus only in a point that the fifth modified example apparatus corrects the lower limit vehicle speed SLnow in accordance with whether the wall (the roadside wall) exists on the road on which the host vehicle travels, whether it is in bad weather (rainy or foggy), whether it is nighttime, and whether height of the host vehicle is low. Thus, a description will hereinafter be centered on this different point.

Figure 14:
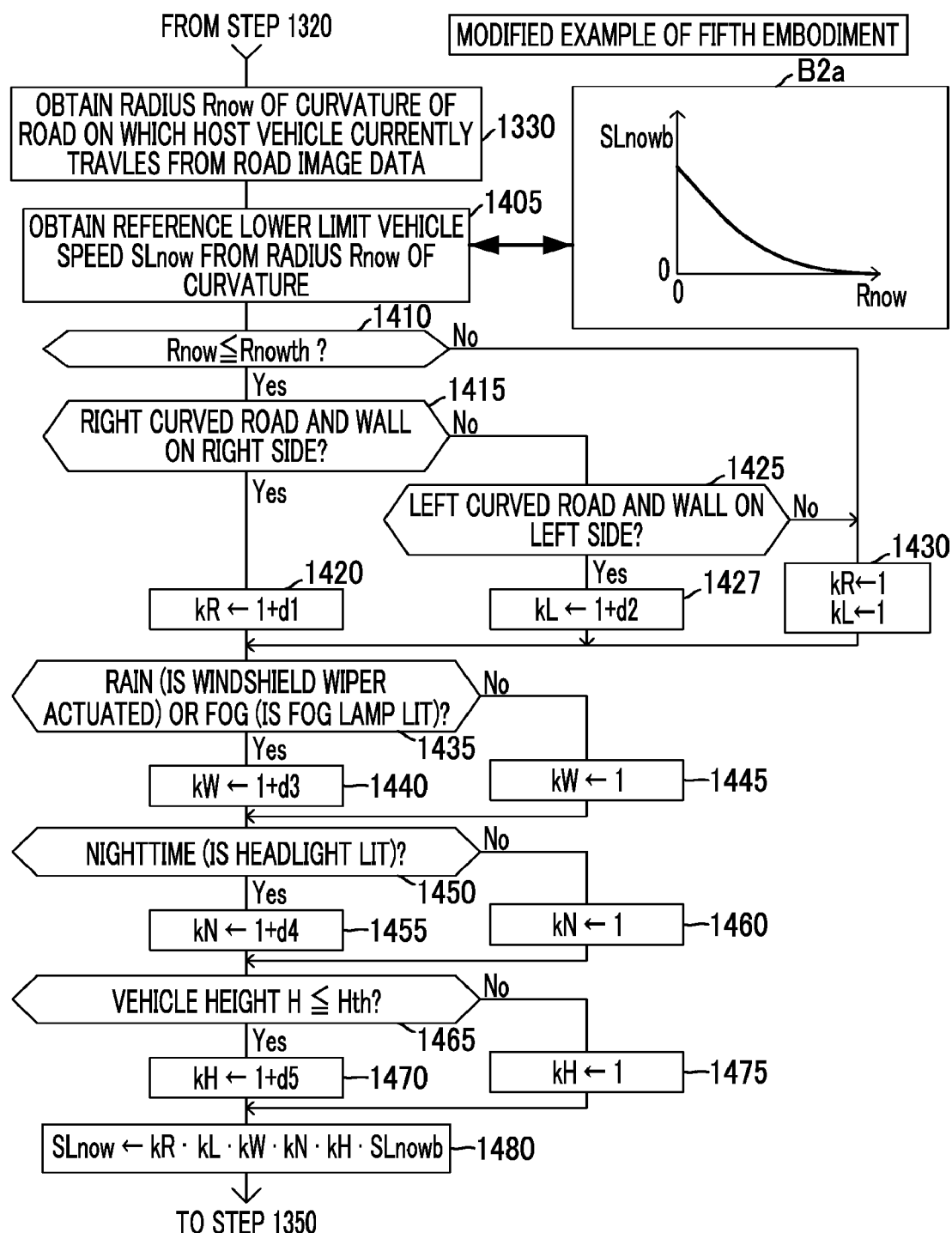
FIG. 14 is a flowchart of a routine that is executed by a CPU of a vehicle travel control apparatus according to a modified example of the fifth embodiment of the disclosure.

(Specific Actuation) A CPU of the drive assist ECU 10 according to the fifth modified example apparatus differs from that according to the fifth apparatus only in a point that step 1340 of FIG. 13 is replaced with step 1405 to step 1480 shown in FIG. 14.

That is, after the CPU obtains the radius Rnow of curvature in step 1330, the processing proceeds to step 1405 in FIG. 14, and the CPU determines a reference value of the lower limit vehicle speed SLnow (a reference lower limit vehicle speed) SLnowb at the current time point by applying the radius Rnow of curvature of the road on which the host vehicle travels at the current time point to a lookup table MapSLnowb(Rnow) shown in a block B2a of FIG. 14. This table MapSLnowb(Rnow) is the same as the table MapSLnow(Rnow). According to this, the reference lower limit vehicle speed SLnowb is computed to be increased as the radius Rnow of curvature is reduced.

Next, the processing proceeds to step 1410, and the CPU determines whether the radius Rnow of curvature is equal to or smaller than a threshold Rnowth of radius of curvature. That is, the CPU determines whether the host vehicle travels on the relatively sharp curved road (the sharp curve) at the current time point. If the radius Rnow of curvature is equal to or smaller than the threshold Rnowth of radius of curvature, the CPU determines "Yes" in step 1410, the processing proceeds to step 1415, and the CPU determines whether the road on which the host vehicle travels at the current time point is a right curved road (a right curve) and the roadside wall such as a noise abatement wall is provided on a right side of the road on the basis of the road image data. If the road on which the host vehicle travels at the current time point is the right curved road (the right curve) and the roadside wall is provided on the right side of the road, the CPU determines "Yes" in step 1415, the processing proceeds to step 1420, and the CPU sets a value of a correction coefficient kR to "1+d1". The value d1 is a value that is larger than 0 and smaller than 1 (for example, 0.1). Thereafter, the processing proceeds to step 1435.

On the other hand, if a determination condition of step 1415 is not established, the processing proceeds from step 1415 to step 1425, and the CPU determines whether the road on which the host vehicle travels at the current time point is a left curved road (a left curve) and the roadside wall such as the noise abatement wall is provided on a left side of the road on the basis of the road image data. If the road on which the host vehicle travels at the current time point is the left curved road (the left curve) and the roadside wall is provided on the left side of the road, the CPU determines "Yes" in step 1425, the processing proceeds to step 1427, and the CPU sets a value of a correction coefficient kL to "1+d2". The value d2 is a value that is larger than 0 and smaller than 1 (for example, 0.1). Thereafter, the processing proceeds to step 1435.

Furthermore, if a determination condition of step 1425 is not established, the processing proceeds from step 1425 to step 1430, and the CPU sets each of the correction coefficient kR and the correction coefficient kL to "1". Thereafter, the processing proceeds to step 1435. Note that, if the radius Rnow of curvature is not equal to or smaller than the threshold Rnowth of radius of curvature at a time point at which the CPU executes the processing in step 1410, the CPU determines "No" in step 1410, and the processing proceeds to step 1430 and next proceeds to step 1435. Accordingly, also in this case, each of the correction coefficient kR and the correction coefficient kL is set to "1".

When the processing proceeds to step 1435, the CPU determines whether it is rainy or foggy at the current time point. For example, the CPU determines whether a windshield wiper, which is not shown, of the host vehicle is actuated. If the windshield wiper is actuated, the CPU determines that the weather at the current time point is rainy. Furthermore, for example, the CPU determines whether a fog lamp, which is not shown, of the host vehicle is lit. If the fog lamp is lit, the CPU determines it is foggy at the current time point. Note that the CPU may obtain information on weather (whether it is rainy and foggy, and the like) of a region where the host vehicle travels from outside (for example, a weather information providing center) by using a communication device with the outside, which is not shown, and may execute the processing in step 1435 on the basis of the information.

If the determination condition of step 1435 is established, the processing proceeds to step 1440, and the CPU sets a value of a correction coefficient kW to "1+d3". The value d3 is a value that is larger than 0 and smaller than 1 (for example, 0.1). Thereafter, the processing proceeds to step 1450. On the other hand, if the determination condition of step 1435 is not established, the processing proceeds to step 1445, and the CPU sets the value of the correction coefficient kW to "1" Thereafter, the processing proceeds to step 1450.

When the processing proceeds to step 1450, the CPU determines whether it is the nighttime at the current time point. For example, the CPU determines whether a headlight, which is not shown, of the host vehicle is lit. If the headlight is lit, the CPU determines that it is the nighttime at the current time point. Note that the CPU may determine whether it is the nighttime at the current time point by using an illuminance sensor, which is not shown (for example, see Japanese Patent No. 4465817).

If a determination condition of step 1450 is established, the processing proceeds to step 1455, and the CPU sets a value of a correction coefficient kN to "1+d4". The value d4 is a value that is larger than 0 and smaller than 1 (for example, 0.1). Thereafter, the processing proceeds to step 1465. On the other hand, if the determination condition of step 1450 is not established, the processing proceeds to step 1460, and the CPU sets the value of the correction coefficient kN to "1". Thereafter, the processing proceeds to step 1465.

When the processing proceeds to step 1465, the CPU reads "vehicle height H of the host vehicle" that is stored in the ROM of the ECU 10, and determines whether the vehicle height H is equal to or lower than a vehicle height threshold Hth. If the vehicle height H is equal to or lower than the vehicle height threshold Hth, the processing proceeds to step 1470, and the CPU sets a value of a correction coefficient kH to "1+d5". The value d5 is a value that is larger than 0 and smaller than 1 (for example, 0.1). Thereafter, the processing proceeds to step 1480. On the other hand, if the vehicle height H is higher than the vehicle height threshold Hth, the processing proceeds to step 1475, and the CPU sets the value of the correction coefficient kH to "1". Thereafter, the processing proceeds to step 1480.

When the processing proceeds to step 1480, the CPU multiplies the reference lower limit vehicle speed SLnowb by the correction coefficients kR, kL, kW, kN, and kH in accordance with the following equation (1) and thereby corrects the reference lower limit vehicle speed SLnowb to compute the lower limit vehicle speed SLnow. Then the processing proceeds to step 1350 in FIG. 13. The lower limit vehicle speed $$SLnow = kR \cdot kL \cdot kW \cdot kN \cdot kH \cdot SLnowb \qquad (1)$$

According to this fifth modified example apparatus, the lower limit vehicle speed SLnow is corrected to be increased in the case where the host vehicle is less likely to be recognized by the driver of the vehicle behind (in the case of the poor visibility), such as the case where the roadside wall exists on the side to which the host vehicle turns on the curved road, the case of the bad weather, the case of the nighttime, or the case where the vehicle height H of the host vehicle is low. As a result, a possibility that the driver of the vehicle behind has to abruptly brake the vehicle behind when recognizing the host vehicle can further reliably be reduced. Note that the values d1, d2, d3, d4, and d5 may differ or be the same.

Sixth Embodiment

A description will next be made on a vehicle travel control apparatus (hereinafter may be referred to as a "sixth apparatus") according to a sixth embodiment of the disclosure. When determining that the driver is in the driving incapable abnormal state, the sixth apparatus decelerates the host vehicle at the constant deceleration Dec and obtains the current position Pnow of the host vehicle and a position Ptg of a pass of the road on which the host vehicle currently travels (a point where a grade changes from an up grade to a down grade) from the GPS receiver 21 and the map database 22 via the navigation ECU 20.

When the vehicle travels on the road with the up grade in front of a point of the pass, the driver of the vehicle has difficulty in visually recognizing a situation ahead of the point of the pass. That is, the driver has the poor visibility in front of the pass as on the curved road. Accordingly, in the case where the vehicle whose driver has been determined to be in the driving incapable abnormal state (the deceleration target vehicle) and which has forcibly been decelerated as a result travels at the excessively low vehicle speed at a point ahead of the point of the pass, the driver of the vehicle behind has to abruptly brake the vehicle behind after the vehicle behind passes the point of the pass and the driver of the vehicle behind recognizes the vehicle. Furthermore, timing at which the driver of the vehicle behind first recognizes the deceleration target vehicle that passes the pass is delayed longer as a difference between a road grade immediately before the pass and a road grade immediately after the pass (a grade change amount) is increased.

Based on such a viewpoint, the sixth apparatus obtains the grade change amount of the pass that the deceleration target vehicle has passed from the map database 22 via the navigation ECU 20 and sets the lower limit vehicle speed on the basis of the grade change amount. Furthermore, the sixth apparatus computes a distance D for which the deceleration target vehicle has traveled after passing the point of the pass, and corrects to increase the lower limit vehicle speed as the distance D is reduced.

Then, in the case where the vehicle speed SPD becomes equal to or lower than the lower limit vehicle speed SPDmin, the sixth apparatus temporarily stops the deceleration to make the vehicle travel at the constant speed (that is, keeps the vehicle speed) or accelerates the host vehicle at the constant acceleration until the vehicle speed matches the lower limit vehicle speed SPDmin. In this way, in the case where the driver of the vehicle behind recognizes the deceleration target vehicle when the vehicle behind passes the point of the pass, the driver of the vehicle behind can decelerate or stop the vehicle behind without abruptly braking the vehicle behind. What has been described so far is the overview of actuation of the sixth apparatus.

(Specific Actuation) Next, a description will be made on specific actuation of the CPU in the ECU 10 according to the sixth apparatus. The CPU executes the routines shown in the flowcharts of FIG. 15 which replaces FIG. 3, FIG. 4, and FIG. 5 every time a specified time elapses. Because the flowcharts of FIG. 4 and FIG. 5 have already been described, a description will hereinafter be made on actuation (vehicle deceleration processing) based on the flowchart of FIG. 15.

Figure 15:
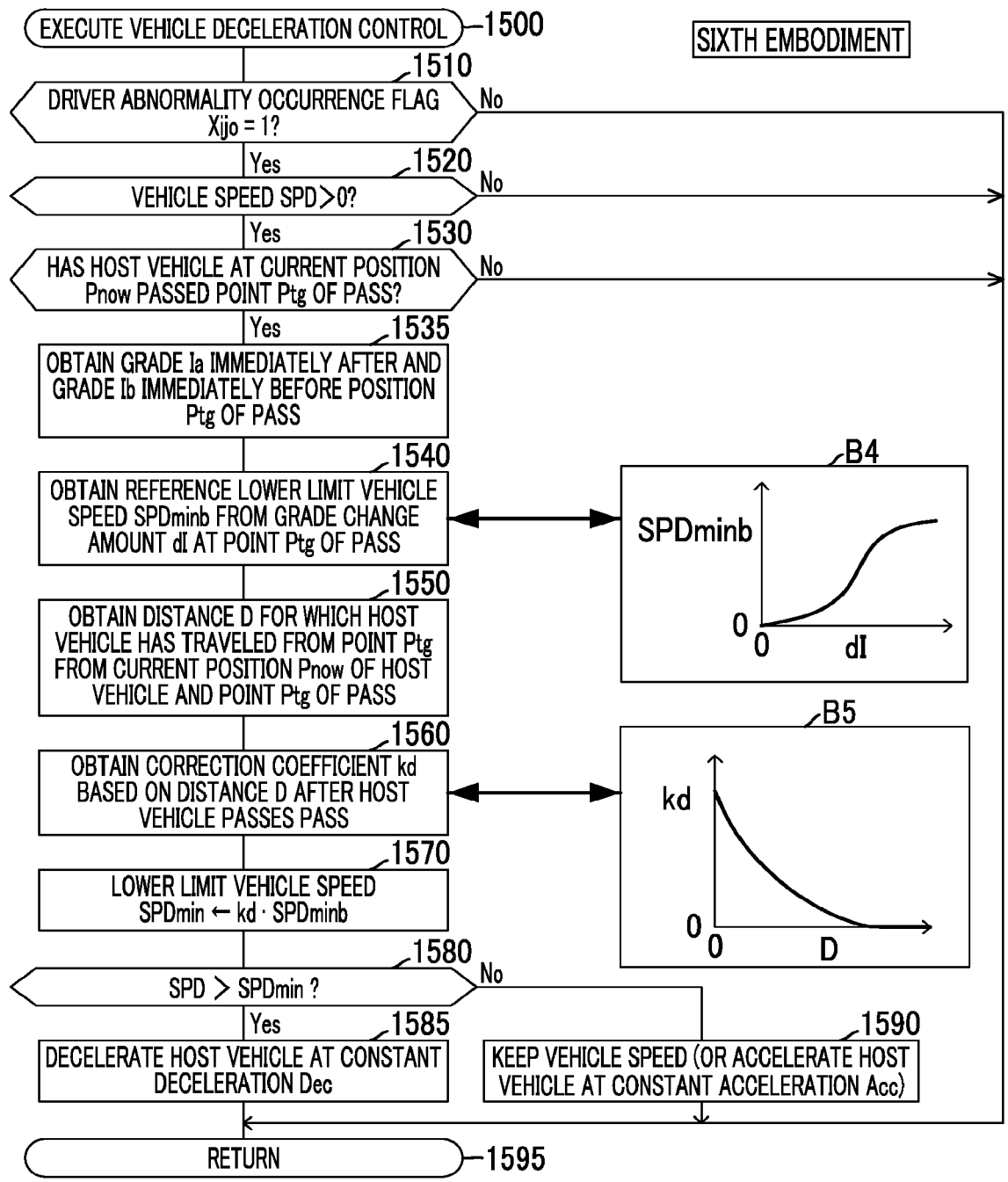
FIG. 15 is a flowchart of a routine that is executed by a CPU of a vehicle travel control apparatus (a sixth apparatus) according to a sixth embodiment of the disclosure.

At specified timing, the CPU starts the processing from step 1500 in FIG. 15, the processing proceeds to step 1510, and the CPU determines whether the value of the driver abnormality occurrence flag Xijo is "1". If the value of the flag Xijo is not "1", the CPU determines "No" in step 1510, the processing directly proceeds to step 1595, and this routine is terminated once. Thus, in this case, the host vehicle is not forcibly decelerated.

On the other hand, if the value of the driver abnormality occurrence flag Xijo is "1" at a time point at which the CPU executes the processing in step 1510, the CPU determines "Yes" in 1510, the processing proceeds to step 1520, and the CPU determines whether the vehicle speed SPD is higher than "0". If the vehicle speed SPD is "0", the CPU determines "No" in step 1520. Then, the processing directly proceeds to step 1595, and this routine is terminated once.

On the other hand, if the vehicle speed SPD is higher than "0", the CPU determines "Yes" in step 1520, and the processing proceeds to step 1530. The CPU obtains the position Pnow of the host vehicle at the current time point, the position Pold of the host vehicle before the specified time, and the position Ptg of the pass of the road on which the host vehicle currently travels from the navigation ECU 20. Then, based on these, the CPU determines whether the host vehicle has passed the position Ptg of the pass of the road. If the host vehicle has not passed the position Ptg of the pass of the road, the CPU determines "No" in step 1530. Then, the processing directly proceeds to step 1595, and this routine is terminated once.

On the other hand, if the host vehicle has passed the position Ptg of the pass of the road, the CPU determines "Yes" in step 1530 and sequentially executes processing from step 1535 to step 1570, which will be described below, and the processing proceeds to step 1580. Note that in the case where the CPU executes the processing in step 1530 immediately after the host vehicle passes the position Ptg of the pass of the road, the CPU sets the travel distance D, which will be described below, to "0".

Step 1535: The CPU obtains a road grade Ib (Ib>0) immediately before the position Ptg of the pass and a road grade Ia (Ia<0) immediately after the position Ptg of the pass from the map database 22 via the navigation ECU 20 and obtains a difference therebetween (that is, a grade change amount) dI (=Ib−Ia). Step 1540: The CPU determines a reference lower limit vehicle speed SPDminb by applying the grade change amount dI to a lookup table MapSPDminb (dI) shown in a block B4 of FIG. 15. According to this table MapSPDminb(dI), the reference lower limit vehicle speed SPDminb is computed to be increased as the grade change amount dI is increased.

Step 1550: Based on the position Ptg of the pass and the position Pnow of the host vehicle, the CPU obtains the distance (the travel distance) D for which the host vehicle has traveled from the position Ptg of the pass. Step 1560: The CPU determines a correction coefficient kd by applying the travel distance D to a lookup table Mapkd(D) shown in a block B5 of FIG. 15. According to this table Mapkd(D), the correction coefficient kd is computed to be reduced as the travel distance D is increased. The correction coefficient kd becomes "0" when the travel distance becomes equal to or longer than a threshold distance. Step 1570: The CPU obtains the lower limit vehicle speed SPDmin by multiplying the reference lower limit vehicle speed SPDminb by the correction coefficient kd.

Next, the processing proceeds to step 1580, and the CPU determines whether the vehicle speed SPD at the current time point is higher than the lower limit vehicle speed SPDmin. If the vehicle speed SPD at the current time point is higher than the lower limit vehicle speed SPDmin, the CPU determines "Yes" in step 1580, the processing proceeds to 1585, and the CPU decelerates the host vehicle at the constant deceleration Dec. Thereafter, the processing proceeds to step 1595, and this routine is terminated once.

On the other hand, if the vehicle speed SPD at the current time point is equal to or lower than the lower limit vehicle speed SPDmin, the CPU determines "No" in step 1580, the processing proceeds to step 1590, and the CPU temporarily stops the deceleration at the constant deceleration Dec. In addition, if the vehicle speed SPD at the current time point is equal to the lower limit vehicle speed SPDmin, the CPU makes the host vehicle travel at the constant speed. If the vehicle speed SPD at the current time point is lower than the lower limit vehicle speed SPDmin, the CPU accelerates the host vehicle at the constant acceleration Acc until the vehicle speed SPD of the host vehicle matches the lower limit vehicle speed SPDmin. Thereafter, the processing proceeds to step 1595, and this routine is terminated once.

As it has been described so far, the sixth apparatus obtains information on the change amount of the road grade (Ia, Ib) on which the deceleration target vehicle travels as the information on the road shape, and sets the lower limit vehicle speed to the higher value as the grade change amount (dI) at the point of the pass, which is indicated by the info, illation on the grade change amount, is increased. Then, the sixth apparatus controls the vehicle speed of the deceleration target vehicle such that the vehicle speed of the deceleration target vehicle does not become lower than the lower limit vehicle speed. Furthermore, the sixth apparatus increases the lower limit vehicle speed as the travel distance of the deceleration target vehicle from the point of the pass is reduced.

In the case where the deceleration target vehicle travels by passing the pass at which the road grade is changed from the up grade to the down grade, the timing at which the driver of the vehicle behind recognizes the deceleration target vehicle is delayed longer as the grade change amount before and after the pass is increased. Accordingly, when the lower limit vehicle speed is set on the basis of the grade change amount as by the sixth apparatus, a "possibility that the driver of the vehicle behind has to abruptly brake the vehicle behind" due to the deceleration target vehicle can be reduced.

Note that, like the first apparatus to the third apparatus, the sixth apparatus may handle the lower limit vehicle speed that is increased immediately after the deceleration target vehicle passes the point of the pass in a similar manner to the lower limit vehicle speed based on the radius of curvature. That is, the first to the third apparatus may handle higher one of the lower limit vehicle speed that is based on the radius of curvature and is taken into consideration thereby and the lower limit vehicle speed that is increased immediately after the deceleration target vehicle passes the point of the pass as the lower limit vehicle speed. Furthermore, in the case where an acceleration sensor that can detect an inclination of the host vehicle is mounted, the sixth apparatus may determine whether the host vehicle has passed the point of the pass on the basis of a detection value of the acceleration sensor. Moreover, the sixth apparatus may compute the above distance D by "integrating the vehicle speed SPD obtained from the vehicle speed sensor 16".

Seventh Embodiment

Next, a description will be made on a vehicle travel control apparatus (hereinafter may be referred to as a "seventh apparatus") according to a seventh embodiment of the disclosure. The seventh apparatus differs from the first apparatus only in a point that the seventh apparatus makes the driver abnormality determination by using the confirmation button 90. A description will hereinafter be centered on this different point. Note that a driver abnormality determination method of the seventh apparatus can also be applied to the other vehicle travel control apparatuses such as the second to the sixth apparatuses.

Figure 16:
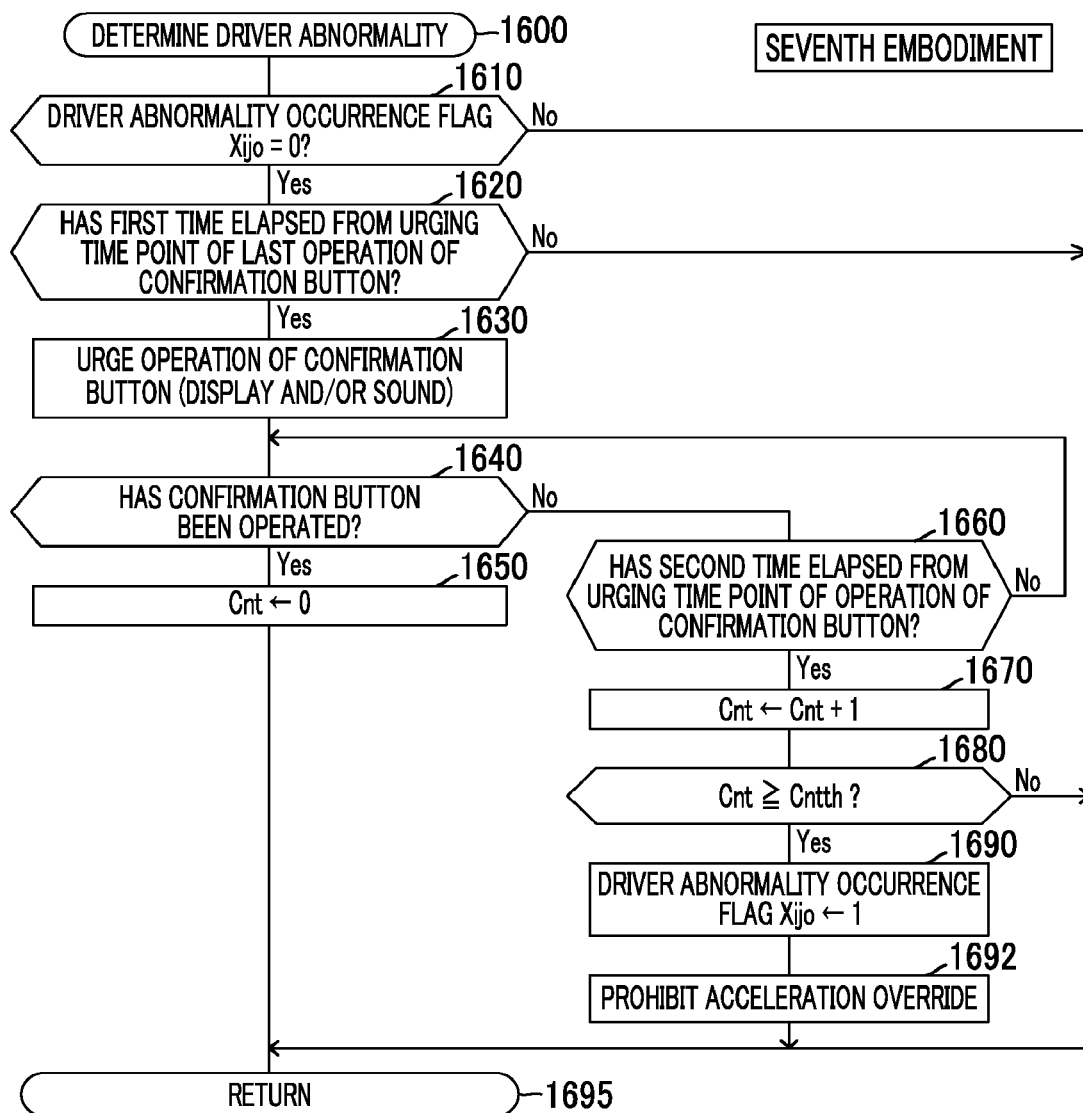
FIG. 16 is a flowchart of a routine that is executed by a CPU of a vehicle travel control apparatus (a seventh apparatus) according to a seventh embodiment of the disclosure.

(Specific Actuation) The CPU of the ECU 10 according to the seventh apparatus executes a routine shown in a flowchart of FIG. 16 every time the specified time elapses. Accordingly, at specified timing, the CPU starts the processing from step 1600 of FIG. 16, the processing proceeds to step 1610, and the CPU determines whether the value of the driver abnormality occurrence flag Xijo is "0". As described above, the value of the flag Xijo is set to "0" in the initial routine.

If the value of the driver abnormality occurrence flag Xijo is "1", the CPU determines "No" in step 1610, the processing directly proceeds to step 1695, and this routine is terminated once.

On the other hand, if the value of the driver abnormality occurrence flag Xijo is "0", the CPU determines "Yes" in step 1610, the processing proceeds to step 1620, and the CPU determines whether a first time has elapsed from a time point at which actuation for urging an operation of the confirmation button 90 is performed (an urging time point). If the first time has not elapsed from the urging time point, the CPU determines "No" in step 1620. Then, the processing directly proceeds to step 1695, and this routine is terminated once.

On the other hand, if the first time has elapsed from the urging time point, the CPU determines "Yes" in step 1620, the processing proceeds to step 1630, and the CPU urges the operation of the confirmation button 90. More specifically, by using the alarm ECU 80, the CPU displays a message of such intent, "Please press the confirmation button 90.", on the indicator 82 and intermittently sounds the buzzer 81. In this way, unless the driver falls in the driving incapable abnormal state, the driver usually operates (presses, that is, turns on) the confirmation button 90.

Next, the processing proceeds to step 1640, and the CPU deter mines whether the confirmation button 90 has been operated. If the confirmation button 90 has been operated, the CPU determines "Yes" in step 1640, the processing proceeds to step 1650, and the CPU sets (clears) a value of a counter Cnt to "0". Then, the processing proceeds to step 1695, and this routine is terminated once.

On the other hand, if the confirmation button 90 has not been operated at a time point at which the CPU executes the processing in step 1640, the CPU determines "No" in step 1640, the processing proceeds to step 1660, and the CPU determines whether a second time has elapsed from the time point at which the CPU urges the operation of the confirmation button 90 (that is, a time point at which the processing in step 1630 is executed). The second time is set as a shorter time than the first time.

If the second time has not elapsed from the time point at which the CPU urges the operation of the confirmation button 90, the CPU determines "No" in step 1660, and the processing returns to step 1640. Accordingly, the CPU monitors whether the confirmation button 90 is operated in a period from the time point at which the CPU urges the operation of the confirmation button 90 to a lapse of the second time.

If the confirmation button 90 is not operated in the period from the time point at which the CPU urges the operation of the confirmation button 90 to the lapse of the second time, the CPU determines "Yes" in step 1660, the processing proceeds to step 1670, and the CPU increases a value of the counter Cnt by "1". Note that the CPU temporarily stops urging the operation of the confirmation button 90 at this time.

Next, the processing proceeds to step 1680, and the CPU deter mines whether the value of the counter Cnt is equal to or larger than a threshold Cnth that corresponds to a threshold time. If the value of the counter Cnt is smaller than the threshold Cnth, the CPU determines "No" in step 1680. Then, the processing directly proceeds to step 1695, and this routine is terminated once. In this case, when the first time elapses, the CPU executes the processing in step 1630 onward again.

Just as described, in the case where the driver falls in the driving incapable abnormal state, the confirmation button 90 is not operated even when the operation of the confirmation button 90 is urged every time the first time elapses. As a result, the value of the counter Cnt is increased in step 1670 and becomes equal to or larger than the threshold Cnth. In this case, the CPU determines "Yes" in step 1680, the processing proceeds to step 1690, and the CPU sets the value of the driver abnormality occurrence flag Xijo to "1". In other words, the CPU confirms such a determination that the driver is in the driving incapable abnormal state.

Next, the processing proceeds to step 1692, and the CPU prohibits the acceleration override. That is, the CPU prohibits the acceleration (including the deceleration) of the vehicle based on the change in the accelerator pedal operation amount AP (disables an acceleration request based on the operation of the accelerator pedal) at this time point (the abnormality determination time point) onward. Thereafter, the processing proceeds to step 1695, and this routine is terminated once.

As it has been described so far, the vehicle travel control apparatus according to each of the embodiments and the modified example of the disclosure decelerates the deceleration target vehicle such that the vehicle speed thereof does not fall below the lower limit vehicle speed, and the lower limit vehicle speed is set on the basis of the road shape that influences the timing (delays the timing) at which the driver of the vehicle behind the deceleration target vehicle visually recognizes the deceleration target vehicle. Thus, the possibility that the driver of the vehicle behind has to abruptly brake the vehicle behind due to the deceleration target vehicle can be reduced. In addition, the above-described embodiments may be combined within the scope that does not produce any discrepancy.

The disclosure is not limited to the above embodiments and modified example, and various modifications can be adopted therefor within the scope of the disclosure. For example, as abnormality determination means that makes the driver abnormality determination (the processing of determining whether the value of the driver abnormality occurrence flag Xijo is set to "1"), a so-called "driver monitoring technique" disclosed in JP 2013-152700 A may be adopted. More specifically, an image of the driver is captured by using a camera that is provided on a member (for example, a steering wheel, a pillar, and the like) in a vehicle cabin, and a direction of eyesight or a direction of a face of the driver is monitored by using the captured image. Then, in the case where the direction of the eyesight or the direction of the face of the driver continues to correspond to a direction in which the eyesight or the face of the driver does not face for a long time during a normal operation of the vehicle for a time that is equal to or longer than the specified time, the determination that the driver is in the driving incapable abnormal state may be confirmed, and the value of the flag Xijo may be set to "1".

Furthermore, the map database 22 may be mounted on a facility outside of the vehicle (a traffic center) or the like. In this case, each of the vehicle travel control apparatuses according to the embodiments of the disclosure may obtain the information on the road shape (the radius of curvature, the road grade, and the like) by using the communication device, which is not shown.

Moreover, of the vehicle travel control apparatuses according to the embodiments of the disclosure, the apparatus that obtains the information on the road shape from the map database 22 may directly obtain the "lower limit vehicle speed corresponding to the road shape", which is set per section of the road in advance, from the map database 22 instead of the information on the road shape.

The vehicle travel control apparatuses according to the embodiments of the disclosure may make the driver abnormality determination only when both of the lane keeping assist control and the adaptive cruise control are executed through the operation of the operation switch 18 by the driver. Note that the adaptive cruise control is control that makes the host vehicle follow the preceding vehicle while keeping the inter-vehicular distance between the preceding vehicle that travels right in front of the host vehicle and the host vehicle to a specified distance on the basis of the target object information obtained by the radar sensor 17a and the camera device 17b. Because the adaptive cruise control itself is well known, the description thereon will not be made (for example, see Japanese Patent Application Publication No. 2014-148293 (JP 2014-148293 A), Japanese Patent Application Publication No. 2006-315491 (JP 2006-315491 A), the specification of Japanese Patent No. 4172434, the specification of Japanese Patent No. 4929777, and the like).

An example of the driver abnormality determination method in the case where both of lane keeping assist control and the adaptive cruise control are executed is as follows. For example, when an operation in which the steering wheel is not maneuvered and thus the steering torque Tra is zero ("0") continues for a first specified time (Tath: for example, five seconds), the vehicle travel control apparatus tentatively determines that the driver possibly falls in the driving incapable abnormal state. At this time, the vehicle travel control apparatus starts decelerating the host vehicle at the extremely low deceleration from this state. Then, when a state where neither the accelerator pedal operation amount AP nor the steering torque Tra is changed thereby continues for a second specified time (Tbth: for example, 30 seconds to 1 minute), the vehicle travel control apparatus confirms the determination that the driver falls in the driving incapable abnormal state.

What is claimed is:
1. A vehicle travel control apparatus comprising:
at least one actuator; and
at least one electronic control unit configured to:
determine whether a driver of a vehicle is in an abnormal state where the driver loses an ability of driving the vehicle,
stop the vehicle at an abnormality determination time point onward, the abnormality determination time point being a time point at which it is determined that the driver is in the abnormal state,
control a vehicle speed of the vehicle by using the at least one actuator such that the vehicle speed does not become lower than a lower limit vehicle speed, in a period from the abnormality determination time point to a time point at which the vehicle is stopped, the lower limit vehicle speed being set in accordance with a road shape, the road shape being among shapes of the road on which the vehicle travels,
obtain information on the road shape,
set the lower limit vehicle speed based on the information on the road shape,
obtain information on a radius of curvature of the road at a point ahead of a point at which the vehicle travels at a current time point as the information on the road shape, and
set the lower limit vehicle speed to a higher value as the radius of curvature indicated by the information on the radius of curvature is reduced.

2. The vehicle travel control apparatus according to claim 1, wherein the at least one electronic control unit is configured to:
obtain the radius of curvature or the curvature of at least one section of the road as information on the radius of curvature of the road from a map database, set the lower limit vehicle speed for each of the section based on the radius of curvature or the curvature of each of the section, determine a particular point reaching time point, the particular point reaching time point being determined such that the vehicle speed of the vehicle in a period from the particular point reaching time point to the time point at which the vehicle is stopped does not become lower than the lower limit vehicle speed, the particular point reaching time point being at which the vehicle reaches a particular point ahead of a position at the abnormality determination time point, the lower limit vehicle speed being set for each of the section, when the vehicle reaches the particular point reaching time point while keeping a vehicle speed at the abnormality determination time point, and the vehicle is decelerated at constant deceleration from the particular point reaching time point, and make the vehicle travel at the vehicle speed at the abnormality determination time point, from the abnormality determination time point to the particular point reaching time point, and decelerate by using the at least one actuator the vehicle at the constant deceleration from the particular point reaching time point.

3. The vehicle travel control apparatus according to claim 1, wherein the at least one electronic control unit is configured to:

obtain the radius of curvature or the curvature of at least one section of the road as the information on the radius of curvature of the road from a map database, set the lower limit vehicle speed for each of the section based on the radius of curvature or the curvature of each of the section, determine constant deceleration such that the vehicle speed of the vehicle in the period from the abnormality determination time point to the time point at which the vehicle is stopped does not become lower than the lower limit vehicle speed set for each of the section when the vehicle is decelerated at the constant deceleration from the abnormality determination time point, and decelerate the vehicle at the constant deceleration by using the at least one actuator from the abnormality determination time point.

4. The vehicle travel control apparatus according to claim 1, wherein the at least one electronic control unit is configured to:

obtain the radius of curvature or the curvature of at least one section as the information on the radius of curvature of the road from a map database, set the lower limit vehicle speed for each of the section based on the radius of curvature or the curvature of each of the section, decelerate the vehicle at constant deceleration at the abnormality determination time point onward, and temporarily interrupt deceleration of the vehicle and keep the vehicle speed of the vehicle in a period in which it is predicted that the vehicle speed of the vehicle becomes lower than the lower limit vehicle speed set for each of the section, the period being in the period from the abnormality determination time point to the time point at which the vehicle is stopped.

5. The vehicle travel control apparatus according to claim 1, further comprising:

a camera device that obtains image data by capturing an image in front of the vehicle, wherein the at least one electronic control unit is configured to:

obtain the radius of curvature or the curvature of the road at a particular point ahead of a position of the vehicle at the current time point by a specified distance as the information on the radius of curvature of the road based on the image data, and set the lower limit vehicle speed based on the radius of curvature or the curvature at the particular point, and in a case where it is predicted that the vehicle speed at a time when the vehicle reaches the particular point becomes lower than the lower limit vehicle speed when the vehicle is decelerated at constant deceleration from the abnormality determination time point onward, the at least one electronic control unit is configured to:

make the vehicle travel at a constant speed so as to keep the vehicle speed of the vehicle at a time point when the vehicle speed is predicted, in a case where the vehicle speed of the vehicle at the time point when the vehicle speed is predicted is equal to or higher than the lower limit vehicle speed at the particular point, and accelerate the vehicle by using the at least one actuator such that the vehicle speed of the vehicle becomes equal to or higher than the lower limit vehicle speed at the particular point before the vehicle reaches the particular point in a case where the vehicle speed of the vehicle at the time point when the vehicle speed is predicted is lower than the lower limit vehicle speed at the particular point.

6. The vehicle travel control apparatus according to claim 1, wherein the at least one electronic control unit is configured to:

obtain information on a radius of curvature of the road at the point at which the vehicle travels at the current time point as the information on the road shape.

7. The vehicle travel control apparatus according to claim 6, further comprising:

a camera device that obtains image data by capturing an image in front of the vehicle, wherein the at least one electronic control unit is configured to:

obtain the radius of curvature or the curvature of the road at the point at which the vehicle travels at the current time point as the information on the radius of curvature of the road based on the image data, decelerate the vehicle when the vehicle speed of the vehicle at the current time point is higher than the lower limit vehicle speed at the point at which the vehicle travels at the current time point, and accelerate the vehicle by using the at least one actuator such that the vehicle speed of the vehicle becomes equal to or higher than the lower limit vehicle speed, when the vehicle speed of the vehicle at the current time point is lower than the lower limit vehicle speed at the point at which the vehicle travels at the current time point.

8. The vehicle travel control apparatus according to claim 1, wherein the at least one electronic control unit is configured to:

obtain information on a grade change amount of the road as the information on the road shape, and set the lower limit vehicle speed to a higher value as the grade change amount at a point of a pass, the point of the pass being indicated by the information on the grade change amount, is increased.

9. The vehicle travel control apparatus according to claim 8, wherein the at least one electronic control unit is configured to:

obtain the information on the grade change amount from a map database, and set the lower limit vehicle speed to a higher value as the grade change amount is increased.

10. The vehicle travel control apparatus according to claim 8, wherein the at least one electronic control unit is configured to:

obtain a travel distance for which the vehicle travels after passing the point of the pass, and set the lower limit vehicle speed to a higher value as the travel distance is reduced.

11. The vehicle travel control apparatus according to claim 1, wherein the at least one electronic control unit is configured to determine that the driver of the vehicle is in the abnormal state when the driver of the vehicle does not perform a predetermined operation for a longer time than a predetermined time.

12. The vehicle travel control apparatus according to claim 11, wherein the at least one electronic control unit is configured to determine that the driver of the vehicle is in the abnormal state when the driver of the vehicle does not perform a drive operation for the longer time than the predetermined time.

13. The vehicle travel control apparatus according to claim 1, further comprising:

a confirmation button mounted on the vehicle, wherein the at least one electronic control unit is configured to:

make notification of urging the driver of the vehicle to operate the confirmation button, and determine that the driver of the vehicle is in the abnormal state when the driver of the vehicle does not operate the confirmation button for a predetermined time after the notification is made.

* * * * *